(12) United States Patent
Kobayashi et al.

(10) Patent No.: US 11,215,237 B2
(45) Date of Patent: Jan. 4, 2022

(54) CLUTCH DEVICE

(71) Applicant: Kabushiki Kaisha F.C.C., Hamamatsu (JP)

(72) Inventors: Yuki Kobayashi, Shizuoka (JP); Keisuke Shimizu, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 16/753,002

(22) PCT Filed: Sep. 28, 2018

(86) PCT No.: PCT/JP2018/036284
§ 371 (c)(1),
(2) Date: Apr. 2, 2020

(87) PCT Pub. No.: WO2019/082597
PCT Pub. Date: May 2, 2019

(65) Prior Publication Data
US 2020/0292010 A1  Sep. 17, 2020

(30) Foreign Application Priority Data

Oct. 26, 2017  (JP) .............................. JP2017-207188

(51) Int. Cl.
*F16D 13/56* (2006.01)
(52) U.S. Cl.
CPC ........ *F16D 13/56* (2013.01); *F16D 2013/565* (2013.01)
(58) Field of Classification Search
CPC ..................................... F16D 13/52–2013/565
See application file for complete search history.

(56) References Cited

U.S. PATENT DOCUMENTS 9,200,681 B2 * 12/2015 Tokumoto ............... F16D 13/56
2008/0099298 A1   5/2008 Yoshinaga et al.
(Continued)

FOREIGN PATENT DOCUMENTS

DE    102016122792 A1    6/2017
EP        3181933 A1    6/2017
(Continued)

OTHER PUBLICATIONS

International Search Report (ISR) dated Dec. 25, 2018 filed in PCT/JP2018/036284.
(Continued)

*Primary Examiner* — Ernesto A Suarez
*Assistant Examiner* — James J Taylor, II
(74) *Attorney, Agent, or Firm* — Rankin, Hill & Clark LLP

(57) ABSTRACT

Provided is a clutch device configured so that different desired torque values can be set without influence between assist torque and slipper torque. A clutch device 100 includes a center clutch 105 holding clutch plates 104 arranged facing friction plates 103 to be rotatably driven by a drive shaft, and a pressure clutch 111. The center clutch 105 includes center-side assist cam surfaces 106a and center-side slipper cam surfaces 106b. The pressure clutch 111 includes pressure-side assist cam surfaces 112a and pressure-side slipper cam surfaces 112b. A contact surface between the center-side assist cam surface 106a and the pressure-side assist cam surface 112a and a contact surface between the center-side slipper cam surface 106b and the pressure-side slipper cam surface 112b are formed at different positions in a radial direction.

8 Claims, 15 Drawing Sheets

(56) References Cited

U.S. PATENT DOCUMENTS

| | | |
|---|---|---|
| 2008/0308382 A1 | 12/2008 | Kataoka et al. |
| 2010/0163361 A1 | 7/2010 | Suzuta et al. |
| 2014/0326570 A1 | 11/2014 | Isobe et al. |
| 2015/0337910 A1* | 11/2015 | Yoshimoto .............. F16D 43/12 192/70.27 |
| 2016/0332636 A1 | 11/2016 | Iida et al. |
| 2017/0159725 A1 | 6/2017 | Imanishi |
| 2020/0318694 A1* | 10/2020 | Morone ................. F16D 13/04 |

FOREIGN PATENT DOCUMENTS

| | | |
|---|---|---|
| JP | 2007-177890 A | 7/2007 |
| JP | 2008-106846 A | 5/2008 |
| JP | 2010-151232 A | 7/2010 |
| JP | 2010223296 A | 10/2010 |
| JP | 2013-137039 A | 7/2013 |
| JP | 2016-211687 A | 12/2016 |

OTHER PUBLICATIONS

Japanese Office Action (JPOA) dated Apr. 9, 2019 for the corresponding Japanese Patent Application No. 2017-207188 and its English machine translation.
Extended European Search Report (EESR) dated Jun. 11, 2021 for the corresponding European Patent Application No. 18871169.1.

* cited by examiner (A)

(B)

CLUTCH DEVICE

TECHNICAL FIELD

The present invention relates to a clutch device configured to transmit rotary drive force of a drive shaft to be rotatably driven by a motor to a driven shaft configured to drive a drive target body or block such transmission.

BACKGROUND ART

Typically, in a vehicle such as a two-wheel vehicle or a four-wheel vehicle, a clutch device has been used for transmitting rotary drive force of a motor to a drive target body or block such transmission, and is arranged between the motor such as an engine and the drive target body such as a wheel. Generally, in the clutch device, multiple friction plates to be rotated by the rotary drive force of the motor and multiple clutch plates coupled to the drive target body are arranged facing each other, and transmission or blocking of the rotary drive force can be performed as necessary by close contact or separation of the friction plates and the clutch plates.

For example, Patent Literature 1 below discloses a clutch device including cam surfaces for quickly performing transmission or blocking of rotary drive force, and these cam surfaces are provided at opposing surfaces of a clutch member (a center clutch) and a pressure member (a pressure clutch) approaching each other or separating from each other with clutch plates being held. This clutch device is configured such that the clutch member and the pressure member quickly approach each other or separate from each other by assist torque or slipper torque. Such assist torque or slipper torque is generated when a pressure-member-side first cam surface (a pressure-side assist cam surface) and a pressure-member-side second cam surface (a pressure-side slipper cam surface) formed at the pressure member move over a clutch-member-side first cam surface (a center-side assist cam surface) and a clutch-member-side second cam surface (a center-side slipper cam surface) formed at the clutch member.

CITATION LIST

Patent Literature

PATENT LITERATURE 1: JP-A-2013-137039

However, in the clutch device described in Patent Literature 1 above, there is a problem that when an attempt is made to set, e.g., strength of a coil spring provided between the center clutch and the pressure clutch to set a torque value of one of the assist torque or the slipper torque to a desired torque value, a disadvantage that the torque value of the other one of the slipper torque or the assist torque is changed is caused.

The present invention has been made to cope with the above-described problem. An object of the present invention is to provide the following clutch device. In this clutch device, different desired torque values can be set without influence between assist torque and slipper torque.

SUMMARY OF THE INVENTION

In order to achieve the object, a feature of the present invention is a clutch device for transmitting rotary drive force of a drive shaft to a driven shaft or blocking transmission, the clutch device including: a center clutch holding a clutch plate arranged facing a friction plate to be rotatably driven by rotary drive of the drive shaft and coupled to the driven shaft; and a pressure clutch arranged facing the center clutch in a state in which the pressure clutch is able to approach or separate from the center clutch and is rotatable relative to the center clutch and elastically pressing the friction plate or the clutch plate. The pressure clutch has each of a pressure-side assist cam surface and a pressure-side slipper cam surface as inclined surfaces projecting in an axial direction, the center clutch has each of a center-side assist cam surface as an inclined surface configured, for causing the pressure-side assist cam surface to approach the center clutch, such that the center-side assist cam surface and the pressure-side assist cam surface slide on each other to increase approaching force upon the approaching and a center-side slipper cam surface as an inclined surface configured, for separating the pressure-side slipper cam surface, such that the center-side slipper cam surface and the pressure-side slipper cam surface slide on each other to increase separation force upon the separation, and an assist contact surface as a contact surface between the center-side assist cam surface and the pressure-side assist cam surface and a slipper contact surface as a contact surface between the center-side slipper cam surface and the pressure-side slipper cam surface are formed at different positions in a radial direction of the center clutch.

In this case, for forming the assist contact surface and the slipper contact surface at the different positions in the radial direction, the center-side assist cam surface and the center-side slipper cam surface can be formed at different positions in the radial direction, the pressure-side assist cam surface and the pressure-side slipper cam surface can be formed at different positions in the radial direction, the center-side assist cam surface and the center-side slipper cam surface can be formed at the different positions in the radial direction, the pressure-side assist cam surface and the pressure-side slipper cam surface can be formed at the different positions in the radial direction.

According to the feature of the present invention configured as described above, in the clutch device, the assist contact surface as the contact surface between the center-side assist cam surface and the pressure-side assist cam surface and the slipper contact surface as the contact surface between the center-side slipper cam surface and the pressure-side slipper cam surface are formed at the different positions in the radial direction of the center clutch. Thus, the different desired torque values can be each set. That is, according to the present invention, assist torque and slipper torque can be each set to desired torque values without changing strength of a coil spring provided between the center clutch and the pressure clutch.

Note that for setting each of the assist torque and the slipper torque to the desired torque value, the inclination angle of the assist-torque-side cam surface and the inclination angle of the slipper-torque-side cam surface can be set to different inclination angles. Note that in this case, when the center clutch and the pressure clutch are assembled with each other, rattling therebetween might be caused. However, according to the present invention, the assist torque and the slipper torque can be each set to the desired torque values without setting the inclination angle of the assist-torque-side cam surface and the inclination angle of the slipper-torque-side cam surface to the different inclination angles.

Further, another feature of the present invention is the clutch device in which the pressure clutch includes a flat plate ring-shaped support plate arranged facing the center clutch and rotating integrally with the pressure clutch, and at least one of the pressure-side assist cam surface or the pressure-side slipper cam surface is formed at the support plate.

According to another feature of the present invention configured as described above, in the clutch device, the flat plate ring-shaped support plate arranged facing the center clutch and rotating integrally with the pressure clutch is provided at the pressure clutch. Further, at such a support plate, at least one of the pressure-side assist cam surface or the pressure-side slipper cam surface is formed. Thus, the degree of freedom in the design of the pressure and center clutches including the arrangement positions of the pressure-side assist cam surface and the pressure-side slipper cam surface can be improved.

Still another feature of the present invention is the clutch device in which the center clutch includes a flat plate ring-shaped support plate arranged facing the pressure clutch and rotating integrally with the center clutch, and at least one of the center-side assist cam surface or the center-side slipper cam surface is formed at the support plate.

According to still another feature of the present invention configured as described above, in the clutch device, the flat plate ring-shaped support plate arranged facing the pressure clutch and rotating integrally with the center clutch is provided at the center clutch. Further, at such a support plate, at least one of the center-side assist cam surface or the center-side slipper cam surface is formed. Thus, the degree of freedom in the design of the pressure and center clutches including the arrangement positions of the center-side assist cam surface and the center-side slipper cam surface can be improved.

Note that in a case where the support plate is provided at the pressure clutch or the center clutch, the pressure-side assist cam surface, the pressure-side slipper cam surface, the center-side assist cam surface, and the center-side slipper cam surface are not necessarily provided at the support plate. That is, in the clutch device according to the present invention, even in the case of providing the support plate at the pressure clutch or the center clutch, each of the pressure-side assist cam surface and the pressure-side slipper cam surface may be provided only at the pressure clutch. Alternatively, the center-side assist cam surface and the center-side slipper cam surface may be provided only at the center clutch.

Moreover, still another feature of the present invention is that in the clutch device, the slipper contact surface is formed at a position on the inner side of the assist contact surface in the radial direction of the center clutch.

According to still another feature of the present invention configured as described above, in the clutch device, the slipper contact surface is formed at the position on the inner side of the assist contact surface in the radial direction of the center clutch. Thus, the feeling of a clutch device configured such that a difference from the assist torque which is generally greater than the slipper torque is great can be provided to a driver.

Further, still another feature of the present invention is that in the clutch device, the slipper contact surface is formed at a position on the outer side of the assist contact surface in the radial direction of the center clutch.

According to still another feature of the present invention configured as described above, in the clutch device, the slipper contact surface is formed at the position on the outer side of the assist contact surface in the radial direction of the center clutch. Thus, the feeling of a clutch device configured such that a difference from the assist torque which is generally greater than the slipper torque is small can be provided to the driver.

In addition, still another feature of the present invention is that in the clutch device, the slipper contact surface is formed to have a smaller area than the area of the assist contact surface.

According to still another feature of the present invention configured as described above, in the clutch device, the slipper contact surface is formed to have the smaller area than the area of the assist contact surface. Thus, the configuration of a portion forming the center-side slipper cam surface and the pressure-side slipper cam surface can be downsized, and the weights of the center clutch and the pressure clutch can be reduced.

Further, another feature of the present invention is the clutch device, in which the center-side slipper cam surface is formed in a state in which the center-side slipper cam surface is positioned closer to a side of a center inner ring-shaped protruding portion formed at an inner edge portion of the center clutch to protrude in a ring shape in the axial direction and is integrally connected to the center inner ring-shaped protruding portion, or the pressure-side slipper cam surface is formed in a state in which the pressure-side slipper cam surface is positioned closer to a side of a pressure inner ring-shaped protruding portion formed at an inner edge portion of the pressure clutch to protrude in a ring shape in the axial direction and is integrally connected to the pressure inner ring-shaped protruding portion.

According to still another feature of the present invention configured as described above, in the clutch device, the center-side slipper cam surface is formed in a state in which the center-side slipper cam surface is positioned closer to the center inner ring-shaped protruding portion formed at the center clutch and is integrally connected to the center inner ring-shaped protruding portion, or the pressure-side slipper cam surface is formed in a state in which the pressure-side slipper cam surface is positioned closer to the pressure inner ring-shaped protruding portion formed at the pressure clutch and is integrally connected to the pressure inner ring-shaped protruding portion. Thus, shaping of each cam surface is facilitated. Further, stiffness of each of these cam surfaces, the center inner ring-shaped protruding portion, and the pressure inner ring-shaped protruding portion can be improved.

Specifically, as long as at least the length facing the center-side slipper cam surface can be ensured, the radial length of the pressure-side slipper cam surface sliding on the center-side slipper cam surface can be freely set by formation of the center-side slipper cam surface for the center inner ring-shaped protruding portion. Moreover, as long as at least the length facing the pressure-side slipper cam surface can be ensured, the radial length of the center-side slipper cam surface sliding on the pressure-side slipper cam surface can be freely set by formation of the pressure-side slipper cam surface for the pressure inner ring-shaped protruding portion.

Further, still another feature of the present invention is the clutch device, in which the pressure-side slipper cam surface is formed in a state in which the pressure-side slipper cam surface is positioned closer to a side of a pressure outer ring-shaped protruding portion formed at an outer edge portion of the pressure clutch to protrude in a ring shape and is integrally connected to the pressure outer ring-shaped protruding portion, or the center-side slipper cam surface is formed in a state in which the center-side slipper cam surface is positioned closer to a side of a center outer ring-shaped protruding portion formed at an outer edge portion of the center clutch to protrude in a ring shape and is integrally connected to the inside of the center outer ring-shaped protruding portion.

According to still another feature of the present invention configured as described above, in the clutch device, the pressure-side slipper cam surface is formed in a state in which the pressure-side slipper cam surface is positioned closer to the pressure outer ring-shaped protruding portion of the pressure clutch and is integrally connected to the pressure outer ring-shaped protruding portion, or the center-side slipper cam surface is formed in a state in which the center-side slipper cam surface is positioned closer to the center outer ring-shaped protruding portion of the center clutch and is integrally connected to the center outer ring-shaped protruding portion. Thus, shaping of each cam surface is facilitated. Further, stiffness of each of these cam surfaces, the pressure outer ring-shaped protruding portion, and the center outer ring-shaped protruding portion can be improved.

Specifically, as long as at least the length facing the pressure-side slipper cam surface can be ensured, the radial length of the center-side slipper cam surface sliding on the pressure-side slipper cam surface can be freely set by formation of the pressure-side slipper cam surface for the pressure outer ring-shaped protruding portion. Moreover, as long as at least the length facing the center-side slipper cam surface can be ensured, the radial length of the pressure-side slipper cam surface sliding on the center-side slipper cam surface can be freely set by formation of the center-side slipper cam surface for the center outer ring-shaped protruding portion.

DESCRIPTION OF THE EMBODIMENTS

Figure 1:
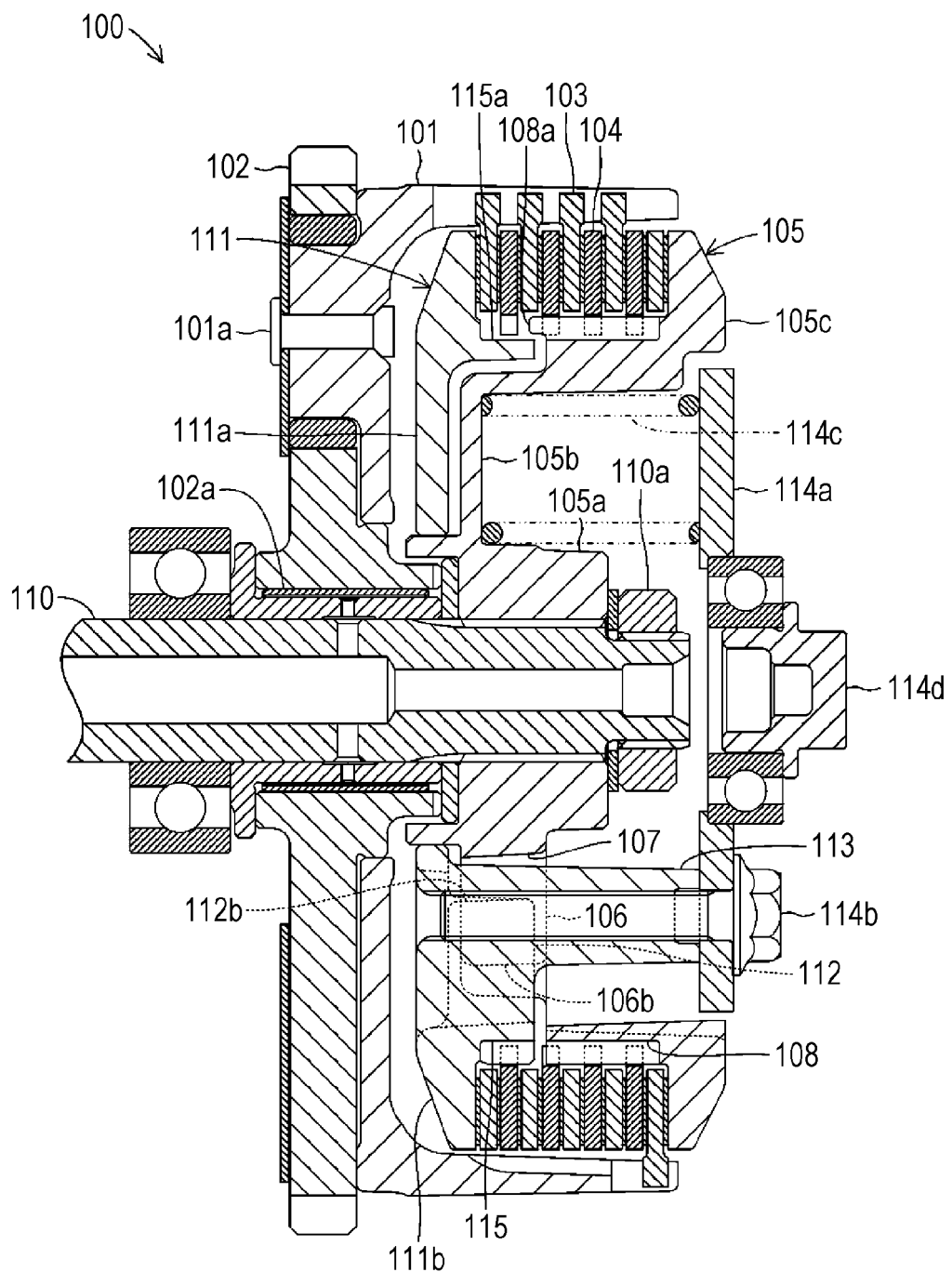
FIG. 1 is a sectional view illustrating the outline of an entire configuration of a clutch device according to one embodiment of the present invention, the clutch device being in a clutch ON state.

Hereinafter, one embodiment of a clutch device according to the present invention will be described with reference to the drawings. FIG. 1 is a sectional view illustrating the outline of an entire configuration of a clutch device 100 according to the present invention. Note that for the sake of easy understanding of the present invention, each figure referred in the present specification is schematically illustrated. For example, some components are exaggeratingly illustrated. For this reason, dimensions and ratios among the components might vary. The clutch device 100 is a mechanical device for transmitting drive force of an engine (not shown) as a motor in a two-wheel vehicle (a motorcycle) to a wheel (not shown) as a drive target body or blocking such transmission, and is arranged between such an engine and a transmission (not shown).

(Configuration of Clutch Device 100)

The clutch device 100 includes a clutch housing 101. The clutch housing 101 is a component for holding friction plates 103 and transmitting the drive force from the engine to the friction plates 103. The clutch housing 101 is formed in such a manner that an aluminum alloy material is shaped into a bottomed cylindrical shape. More specifically, an internal-gear-shaped spline is formed at a tubular portion of the clutch housing 101. Multiple (five in the present embodiment) friction plates 103 are spline-fitted in and held on the spline in a state in which the friction plates 103 are displaceable along an axis line direction of the clutch housing 101 and are rotatable integrally with the clutch housing 101.

In the clutch housing 101, a left side surface thereof as viewed in the figure is attached to an input gear 102 with a rivet 101a through a torque damper (not shown). The input gear 102 is a gear component to be rotatably driven with the input gear 102 engaging with a drive gear coupled to a not-shown drive shaft to be rotatably driven by drive of the engine. The input gear 102 is rotatably supported on a later-described shaft 110 through a bearing 102a. That is, the clutch housing 101 is, at a position concentric with the shaft 110, integrally rotatably driven with the input gear 102 independently of the shaft 110.

The friction plate 103 is a flat plate annular component to be pressed against a clutch plate 104. The friction plate 103 is shaped in such a manner that a thin plate member made of an aluminum material is punched into an annular shape. In this case, external teeth configured to engage with the internal gear-shaped spline of the clutch housing 101 are formed at an outer peripheral portion of each friction plate 103. Not-shown friction members including multiple pieces of paper are each bonded to both side surfaces (front and back surfaces) of each friction plate 103, and a not-shown oil groove is formed between these friction members. Moreover, the friction plates 103 are formed to have the same size and shape.

In the clutch housing 101, multiple (four in the present embodiment) clutch plates 104 are held on a center clutch 105 and a pressure clutch 111 with each clutch plate 104 being sandwiched by corresponding ones of the friction plates 103.

The clutch plate 104 is a flat plate annular component to be pressed against the friction plates 103. The clutch plate 104 is shaped in such a manner that a thin plate member made of a SPCC (cold rolled steel plate) material is punched into an annular shape. Not-shown oil grooves formed for holding clutch oil and having a depth of several μm to several tens of μm are each formed at both side surfaces (front and back surfaces) of each clutch plate 104, and surface hardening treatment is performed for each of these surfaces for the purpose of improving abrasion resistance.

Moreover, at an inner peripheral portion of each clutch plate 104, an internal-gear-shaped spline is formed. Such an internal-gear-shaped spline is spline-fitted in a center-side fitting portion 108 formed at the center clutch 105 and a pressure-side fitting portion 115 formed at the pressure clutch 111. The clutch plates 104 are formed to have the same size and shape. Note that the above-described friction member may be, instead of the above-described friction plate, provided at the clutch plate 104.

Figure 2:
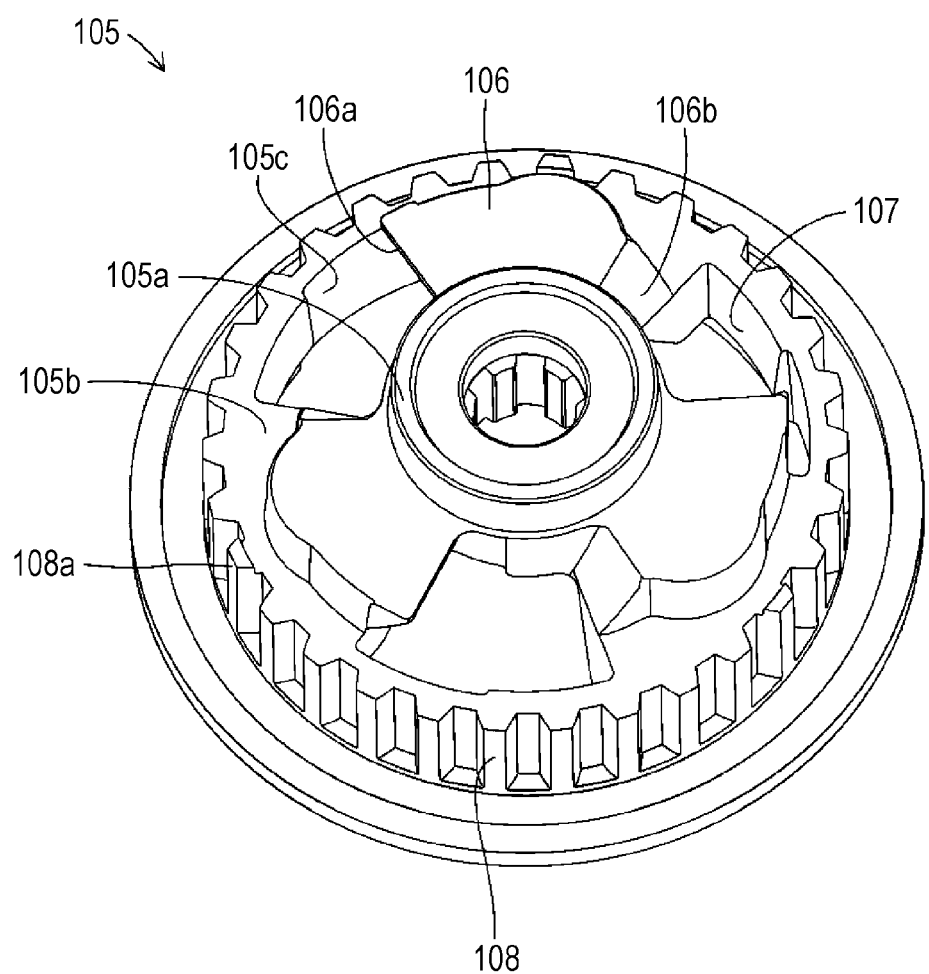
FIG. 2 is a perspective view schematically illustrating an external configuration of a center clutch incorporated in the clutch device illustrated in FIG. 1.
Figure 3:
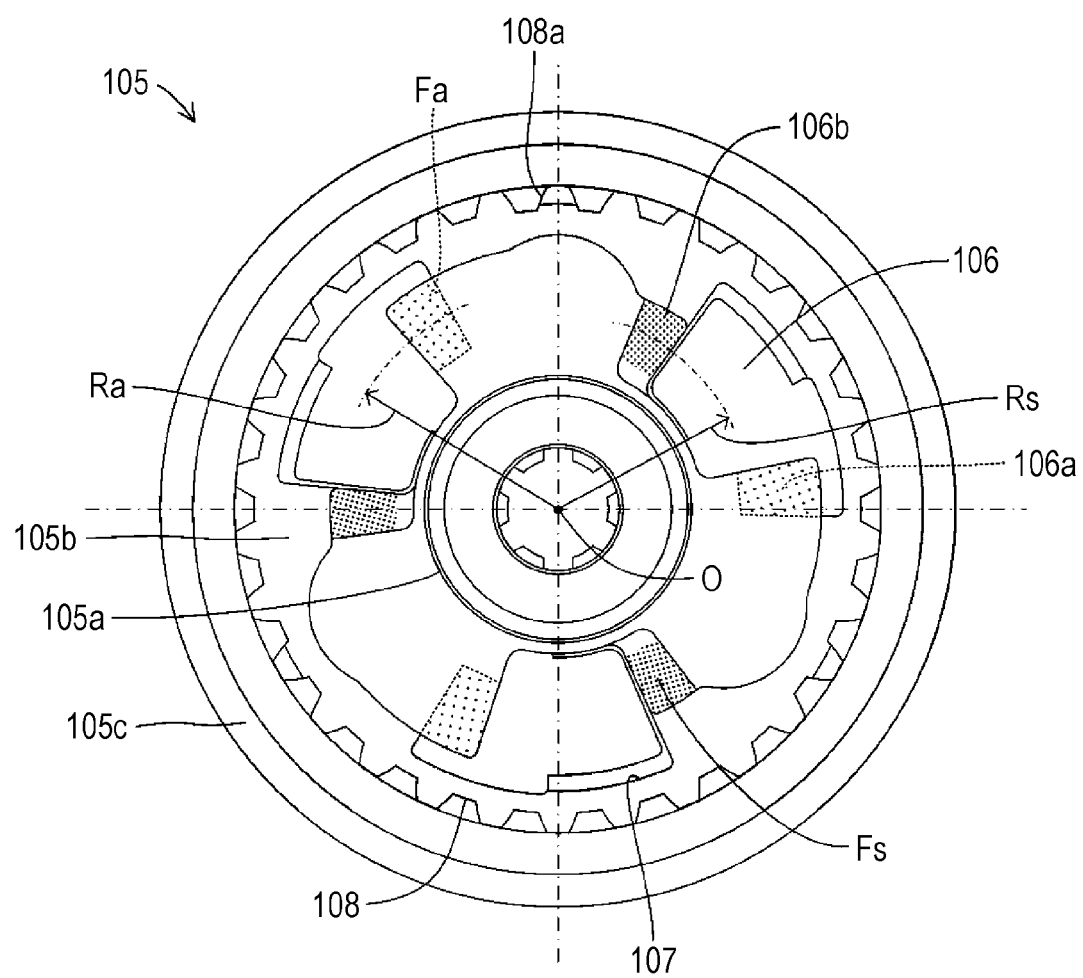
FIG. 3 is a plan view schematically illustrating the external configuration of the center clutch illustrated in FIG. 2.

As illustrated in each of FIGS. 2 and 3, the center clutch 105 is a component for housing each of the clutch plates 104 and the pressure clutch 111 and transmitting the drive force of the engine to a transmission side. The center clutch 105 is formed in such a manner that an aluminum alloy material is shaped into a substantially cylindrical shape. More specifically, the center clutch 105 is formed in such a manner that a center inner ring-shaped protruding portion 105a, an inner plate portion 105b, and a center outer ring-shaped protruding portion 105c are mainly integrally formed.

The center inner ring-shaped protruding portion 105a is a portion to be connected to the shaft 110 while holding the pressure clutch 111. The center inner ring-shaped protruding portion 105a is, at an inner edge portion of the center clutch 105, formed to have a cylindrical shape protruding in a ring shape in an axial direction. At an inner peripheral surface of the center inner ring-shaped protruding portion 105a, an internal-gear-shaped spline is formed along an axis line direction of the center clutch 105. The shaft 110 is spline-fitted in such a spline. That is, the center clutch 105 rotates integrally with the shaft 110 at a position concentric with the clutch housing 101 and the shaft 110.

The inner plate portion 105b is a portion formed between the center inner ring-shaped protruding portion 105a and the center outer ring-shaped protruding portion 105c. The inner plate portion 105b is configured such that each of three support rod through-holes 107 is formed between adjacent ones of three center-side cam portions 106 arranged in a circular shape. Three center-side cam portions 106 are raised portions forming center-side assist cam surfaces 106a and center-side slipper cam surfaces 106b. Three center-side cam portions 106 are formed to extend along a circumferential direction of the center clutch 105. In this case, three center-side cam portions 106 are equally formed along the circumferential direction of the center clutch 105. Moreover, the center-side assist cam surface 106a and the center-side slipper cam surface 106b are each formed at both end portions of each center-side cam portion 106 in the circumferential direction of the center clutch 105.

Each center-side assist cam surface 106a is a portion for generating, in cooperation with a later-described pressure-side assist cam surface 112a, assist torque as force for enhancing pressure contact force between the friction plate 103 and the clutch plate 104. Each center-side assist cam surface 106a is configured as an inclined surface gradually projecting to a pressure clutch 111 side along the circumferential direction of the center clutch 105. In this case, each center-side assist cam surface 106a is formed in a direction facing the support rod through-hole 107. Moreover, each center-side assist cam surface 106a is formed to extend to the vicinity of the center-side fitting portion 108 formed at an outer peripheral portion on the outer side in a radial direction in a state in which the center-side cam portion 106 is integrally connected to the center inner ring-shaped protruding portion 105a.

Each center-side slipper cam surface 106b is a portion for generating, in cooperation with a later-described pressure-side slipper cam surface 112b, slipper torque as force for promptly separating the friction plates 103 and the clutch plates 104 to bring these plates into a half-clutch state. Each center-side slipper cam surface 106b is, on the side opposite to the center-side assist cam surface 106a in the circumferential direction, configured as an inclined surface inclined in the same direction as that of the center-side assist cam surface 106a. In this case, each center-side slipper cam surface 106b is formed in a direction facing the side opposite to the center-side assist cam surface 106a and facing the pressure clutch 111 side.

Moreover, each center-side slipper cam surface 106b is formed to extend outward in the radial direction in a state in which the center-side cam portion 106 is integrally connected to the center inner ring-shaped protruding portion 105a. In this case, each center-side slipper cam surface 106b is formed to have a shorter length than the length of extension of each center-side assist cam surface 106a in the radial direction. With this configuration, each center-side slipper cam surface 106b is, at a position inside a radial position at which the center-side assist cam surface 106a is formed, formed to have a smaller area than the area of the center-side assist cam surface 106a.

Note that the above-described half-clutch state of the clutch device 100 means an incomplete transmission state, and in this state, part of the drive force of the engine is transmitted to a drive wheel side in a state before the friction plates 103 and the clutch plates 104 in the clutch device 100 completely come into close contact with each other.

Three support rod through-holes 107 are through-holes for penetration of later-described three tubular support rods 113. Three support rod through-holes 107 are equally formed along the circumferential direction of the center clutch 105 such that each support rod through-hole 107 is at a position between adjacent ones of three center-side cam portions 106.

The center outer ring-shaped protruding portion 105c is a portion for holding some of the multiple clutch plates 104. The center outer ring-shaped protruding portion 105c is, at an outer edge portion of the center clutch 105, formed to have a cylindrical shape protruding in a ring shape in the axial direction. Further, an end portion of such a cylindrical portion of the center outer ring-shaped protruding portion 105c is formed to project in a flange shape. The center-side fitting portion 108 is formed at an outer peripheral surface of the cylindrical portion of the center outer ring-shaped protruding portion 105c.

The center-side fitting portion 108 is a portion for holding the clutch plates 104 in a state in which the clutch plates 104 sandwich each friction plate 103, are displaceable along the axis line direction of the center clutch 105, and are rotatable integrally with the center clutch 105. The center-side fitting portion 108 includes an external-gear-shaped spline. Moreover, at the center-side fitting portion 108, protruding teeth 108a are formed at part of the spline forming the center-side fitting portion 108.

The protruding tooth 108a is a portion for preventing dropping of the clutch plates 104 and/or the friction plates 103. The protruding tooth 108a is formed in such a manner that one of spline teeth forming the center-side fitting portion 108 extends to have a length reaching above a back clearance portion 115a of the pressure-side fitting portion 115 of the pressure clutch 111. Each protruding tooth 108a is formed at a position adjacent to a corresponding one of three center-side cam portions 106 on the outer side of the center clutch 105 in the radial direction. That is, three protruding teeth 108a are provided at equal intervals along the circumferential direction of the center clutch 105.

The shaft 110 is a shaft body formed in a hollow shape. Of the shaft 110, one end side (the right side as viewed in the figure) rotatably supports the input gear 102 and the clutch housing 101 through the cylindrical bearing 102a, and supports the center clutch 105, in which the shaft 110 is spline-fitted, in a fixed manner through a nut 110a. Of the shaft 110, the other end portion (the left side as viewed in the figure) is coupled to the not-shown transmission of the two-wheel vehicle. That is, the shaft 110 is equivalent to a driven shaft of the present invention.

Figure 4:
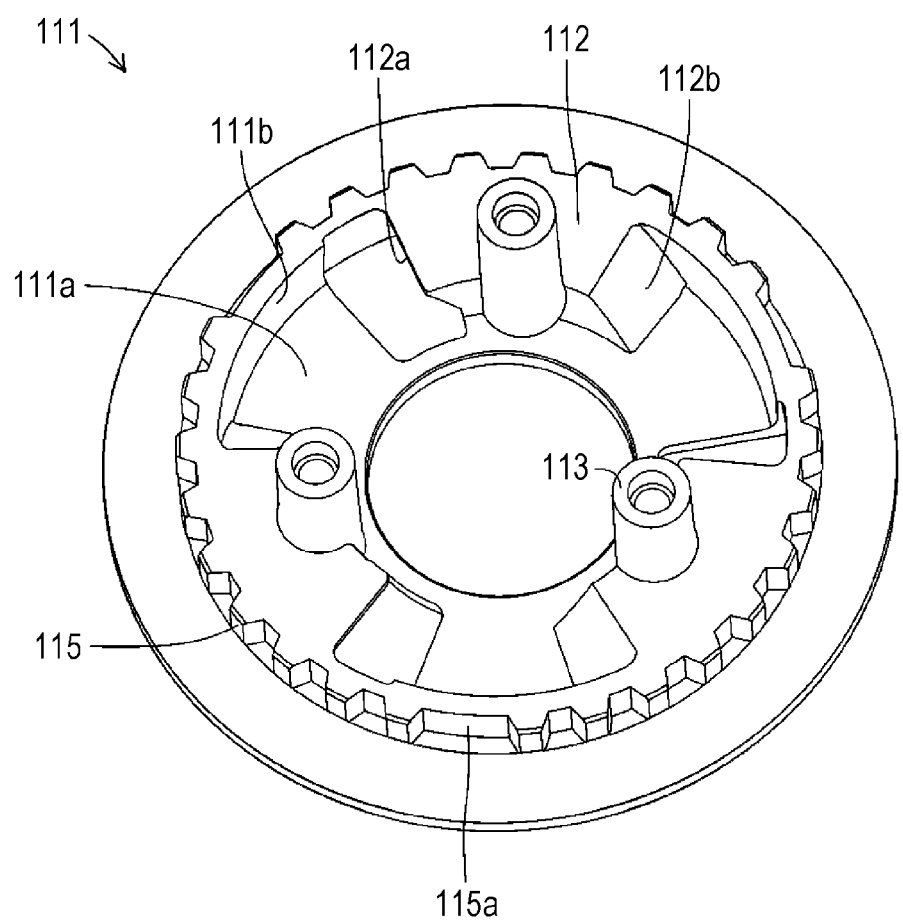
FIG. 4 is a perspective view schematically illustrating an external configuration of a pressure clutch incorporated in the clutch device illustrated in FIG. 1.

The pressure clutch 111 is a component for pressing the friction plates 103 to cause the friction plates 103 and the clutch plates 104 to closely contact with each other. The pressure clutch 111 is formed in such a manner that an aluminum alloy material is shaped into a substantially discoid shape having the substantially same outer diameter size as the outer diameter of the clutch plate 104. More specifically, the pressure clutch 111 is, as illustrated in FIG. 4, mainly formed in such a manner that an inner plate portion 111a and a pressure outer ring-shaped protruding portion 111b are integrally formed.

The inner plate portion 111a has each of three tubular support rods 113 between adjacent ones of three pressure-side cam portions 112 arranged in a circular shape. The inner plate portion 111a is, in a slidable state, fitted onto an outer peripheral surface of the center inner ring-shaped protruding portion 105a of the center clutch 105. That is, the pressure clutch 111 is, at a position concentric with the clutch housing 101, the center clutch 105, and the shaft 110, rotatably provided independently of the center clutch 105 and the shaft 110.

Three pressure-side cam portions 112 are raised portions forming the pressure-side assist cam surfaces 112a and the pressure-side slipper cam surfaces 112b. Three pressure-side cam portions 112 are formed to extend along a circumferential direction of the pressure clutch 111. In this case, three pressure-side cam portions 112 are equally formed along the circumferential direction of the pressure clutch 111. Moreover, the pressure-side assist cam surface 112a and the pressure-side slipper cam surface 112b are each formed at both end portions of each pressure-side cam portion 112 in the circumferential direction of the pressure clutch 111.

Each pressure-side assist cam surface 112a is a portion sliding on the center-side assist cam surface 106a of the center clutch 105. Each pressure-side assist cam surface 112a is configured as an inclined surface gradually projecting to a center clutch 105 side along the circumferential direction of the pressure clutch 111. That is, the center-side assist cam surfaces 106a and the pressure-side assist cam surfaces 112a form an assist mechanism. Each pressure-side assist cam surface 112a is formed to extend to the tubular support rod 113 on the inner side in the radial direction in a state in which the pressure-side cam portion 112 is integrally connected to the later-described pressure-side fitting portion 115.

Each pressure-side slipper cam surface 112b is a portion sliding on the center-side slipper cam surface 106b. Each pressure-side slipper cam surface 112b is, on the side opposite to the pressure-side assist cam surface 112a in the circumferential direction, configured as an inclined surface extending in the same direction as that of the pressure-side assist cam surface 112a. That is, the center-side slipper cam surfaces 106b and the pressure-side slipper cam surfaces 112b form a slipper mechanism.

As in each pressure-side assist cam surface 112a, each pressure-side slipper cam surface 112b is formed to extend to the tubular support rod 113 on the inner side in the radial direction in a state in which the pressure-side cam portion 112 is integrally connected to the pressure-side fitting portion 115. That is, each pressure-side slipper cam surface 112b is formed to have the same length and area as the radial length and area of the pressure-side assist cam surface 112a. Note that needless to say, each pressure-side slipper cam surface 112b may be formed to have the same area as that of the center-side slipper cam surfaces 106b at a position facing the center-side slipper cam surface 106b.

Three tubular support rods 113 are cylindrical portions extending in a columnar shape in the axial direction of the center clutch 105 to support a support plate 114a, and at inner peripheral portions thereof, are provided with internal threads in which attachment bolts 114b are screw-fitted. Three tubular support rods 113 are equally formed along the circumferential direction of the pressure clutch 111.

The support plate 114a is a component for sandwiching clutch springs 114c between the support plate 114a and the inner plate portion 105b of the center clutch 105. The support plate 114a is formed in such a manner that a metal material is formed into a flat plate ring-shaped plate-shaped body. The support plate 114a is, at a position facing the opposite side of the center clutch 105 from the pressure clutch 111, attached to the pressure clutch 111 through the attachment bolts 114b. The support plate 114a displaces and rotates relative to the center clutch 105 integrally with the pressure clutch 111. Moreover, a release pin 114d is provided at a center portion of the support plate 114a through a bearing.

The clutch spring 114c is an elastic body for pressing the pressure clutch 111 to the center clutch 105 side to press the pressure outer ring-shaped protruding portion 111b of the pressure clutch 111 against the friction plates 103. The clutch spring 114c includes a coil spring formed in such a manner that spring steel is wound in a spiral shape. Each clutch spring 114c is arranged between adjacent ones of three tubular support rods 113.

The release pin 114d is a rod-shaped component for pressing the support plate 114a when a transmission state of rotary drive force of the clutch device 100 is brought into a disconnection state, and one end portion (the right side as viewed in the figure) of the release pin 114*d* is connected to a not-shown clutch release mechanism. The clutch release mechanism described herein is a mechanical device configured to press the release pin 114*d* to a shaft 110 side according to operation of a clutch operation lever (not shown) by a driver of a self-propelled vehicle on which the clutch device 100 is mounted.

The pressure outer ring-shaped protruding portion 111*b* is a portion for holding some other clutch plates 104. The pressure outer ring-shaped protruding portion 111*b* is formed to have a cylindrical shape protruding in a ring shape in an axial direction of an outer edge portion of the pressure clutch 111. Further, the pressure outer ring-shaped protruding portion 111*b* is formed such that an end portion of such a cylindrical portion projects in a flange shape. The pressure-side fitting portion 115 is formed at an outer peripheral surface of the cylindrical portion of the pressure outer ring-shaped protruding portion 111*b*.

The pressure-side fitting portion 115 is a portion for holding, together with the friction plates 103, the clutch plates 104 in a state in which the clutch plates 104 are displaceable along an axis line direction of the pressure clutch 111 and are rotatable together with the pressure clutch 111. The pressure-side fitting portion 115 includes an external-gear-shaped spline.

In this case, the spline forming the pressure-side fitting portion 115 is formed to have the same addendum circle, deddendum circle, and tooth thickness as those of the spline forming the center-side fitting portion 108, and is formed to have a shorter tooth width than that of the spline tooth forming the center-side fitting portion 108. Moreover, at the pressure-side fitting portion 115, the back clearance portions 115*a* are formed at part of the spline forming the pressure-side fitting portion 115.

The back clearance portion 115*a* is a portion for preventing physical contact of the protruding teeth 108*a*. The back clearance portion 115*a* includes a curved surface formed in such a manner that one of the spline teeth forming the pressure-side fitting portion 115 is omitted. More specifically, the back clearance portion 115*a* includes a smooth flat arc surface. The arc surface is obtained by omitting one spline tooth of the pressure-side fitting portion 115 corresponding to the positions of the protruding teeth 108*a*. Further, the arc surface is directly connected flush with two tooth bottoms each positioned adjacent to both sides of the omitted spline tooth in the circumferential direction. Thus, the back clearance portions 115*a* are, corresponding to three protruding teeth 108*a*, formed at equal intervals along the circumferential direction of the pressure clutch 111.

Moreover, the inside of the clutch device 100 is filled with a predetermined amount of clutch oil (not shown). The clutch oil is mainly supplied to among the friction plates 103 and the clutch plates 104 to absorb friction heat generated thereamong and prevent abrasion of the friction members. That is, the clutch device 100 is a so-called wet multiplate friction clutch device.

(Actuation of Clutch Device 100)

Next, actuation of the clutch device 100 configured as described above will be described. As described above, the clutch device 100 is arranged between the engine and the transmission in the vehicle. The clutch device 100 performs, according to operation of the clutch operation lever by the driver of the vehicle, transmission of the drive force of the engine to the transmission and blocking of such transmission.

Figure 5:
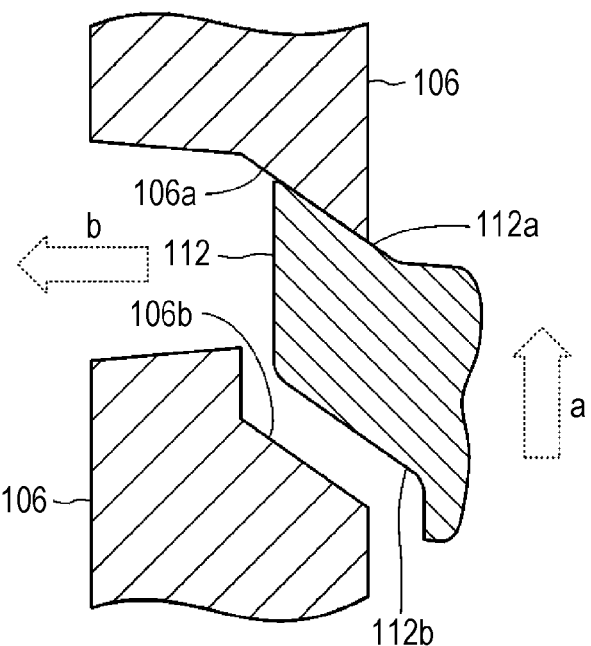
FIGS. 5(A) and 5(B) illustrate a cam surface actuation state in the clutch device illustrated in FIG. 1, (A) being a sectional view schematically illustrating a state in which a pressure-side assist cam surface moves over a center-side assist cam surface and (B) being a sectional view schematically illustrating a state in which a pressure-side slipper cam surface moves over a center-side slipper cam surface.
Figure 5:
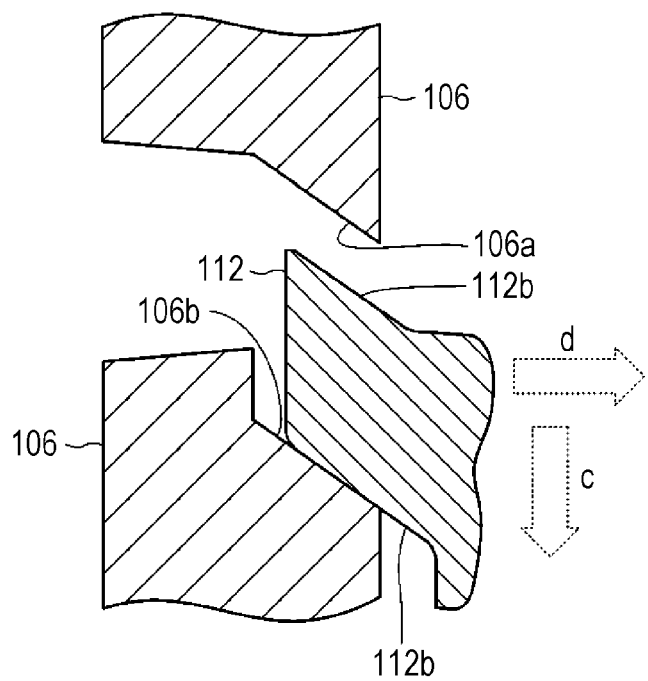

Specifically, as illustrated in each of FIGS. 1 and 5(A), in the clutch device 100, in a case where the driver (not shown) of the vehicle does not operate the clutch operation lever (not shown), the clutch release mechanism (not shown) does not press the release pin 114*d*, and therefore, the pressure clutch 111 presses the friction plates 103 by elastic force of the clutch springs 114*c*. Thus, the friction plates 103 and the clutch plates 104 are brought into a clutch ON state in which these plates are pressed against each other and are friction-coupled to each other, and the center clutch 105 is rotatably driven. That is, rotary drive force of the motor is transmitted to the center clutch 105, and in this manner, the shaft 110 is rotatably driven.

In such a clutch ON state, the pressure clutch 111 displaces (a b-arrow in the figure) in the direction of approaching the center clutch 105 while rotating relative to the center clutch 105 by cam action (an a-arrow in the figure) in which the pressure-side assist cam surface 112*a* formed at the pressure clutch 111 moves over the center-side assist cam surface 106*a* formed at the center clutch 105. This leads to action of the assist function of rapidly enhancing pressing force. Accordingly, the pressure clutch 111 is pressed against the center clutch 105 with strong force by the assist mechanism.

In this case, the assist torque Ta of pressing the pressure clutch 111 against the center clutch 105 is defined by Expression 1 below. In such an expression, "μa" is the coefficient of friction at an assist contact surface Fa at which the center-side assist cam surface 106*a* and the pressure-side assist cam surface 112*a* are in friction contact with each other. "Ra" is the effective diameter of the assist contact surface Fa. "Pa" is rotary drive force acting on the center clutch 105 from a drive shaft side. Moreover, the effective diameter Ra of the assist contact surface Fa is a distance between the center O of rotation of the center clutch 105 (or the pressure clutch 111) and the center position of the width of the center clutch 105 (or the pressure clutch 111) in the radial direction at the assist contact surface Fa. Note that in FIG. 3, the assist contact surface Fa is indicated by light hatching, and a slipper contact surface Fs is indicated by dark hatching.

$$Ta = \mu a \times Ra \times Pa \qquad \text{(Expression 1)}$$

Moreover, in the clutch ON state, in a case where the number of rotations of the drive wheel side exceeds the number of rotations of an engine side due to, e.g., shift down operation for the transmission by the driver, back torque might act on the clutch device 100 because the number of rotations of the shaft 110 exceeds the number of rotations of the input gear 102. In this case, in the clutch device 100, the pressure clutch 111 displaces (a d-arrow in the figure) in the direction of separating from the center clutch 105 while rotating relative to the center clutch 105 by cam action (a c-arrow in the figure) in which the pressure-side slipper cam surface 112*b* formed at the pressure clutch 111 moves over the center-side slipper cam surface 106*b* formed at the center clutch 105, as illustrated in FIG. 5(B). This leads to action of the slipper function of rapidly weakening the pressing force. Thus, in the clutch device 100, the friction plates 103 and the clutch plates 104 start separating from each other. Accordingly, a state in which these plates are pressed against each other is weakened, and a state in which friction coupling is weakened is brought.

In this case, slipper torque Ts acting when the pressure clutch 111 separates from the center clutch 105 is defined by Expression 2 below as in the assist torque Ta. In this expression, "μs" is the friction coefficient at the slipper contact surface Fs at which the center-side slipper cam surface 106b and the pressure-side slipper cam surface 112b are in friction contact with each other. "Rs" is the effective diameter of the slipper contact surface Fs. "Ps" is rotary drive force acting on the pressure clutch 111 from a driven shaft side. Moreover, the effective diameter Rs of the slipper contact surface Fs is a distance between the center O of rotation of the center clutch 105 (or the pressure clutch 111) and the center position of the width of the center clutch 105 (or the pressure clutch 111) in the radial direction at the slipper contact surface Fs. Note that in FIG. 5, the slipper contact surface Fs is indicated by hatching.

$$Ts = \mu s \times Rs \times Ps \quad \text{(Expression 2)}$$

In this case, if the friction coefficient μa and the friction coefficient μs are the same as each other and the rotary drive force Pa and the rotary drive force Ps are the same as each other, the slipper torque Ts is smaller than the assist torque Ta. That is, the clutch device 100 can set, according to the effective diameter Ra of the assist contact surface Fa and the effective diameter Rs of the slipper contact surface Fs, the assist torque Ta and the slipper torque Ts to desired torque values.

Note that in the clutch ON state, the protruding tooth 108a formed at the center outer ring-shaped protruding portion 105c of the center clutch 105 is positioned above the back clearance portion 115a formed at the pressure-side fitting portion 115 of the pressure clutch 111, and the protruding tooth 108a and the back clearance portion 115a overlap with each other. Thus, the friction plates 103 and/or the clutch plates 104 present at a boundary portion between the center-side fitting portion 108 and the pressure-side fitting portion 115 are not dropped from the center outer ring-shaped protruding portion 105c and the pressure outer ring-shaped protruding portion 111b because of the protruding teeth 108a.

Moreover, in a case where the slipper function acts, the protruding teeth 108a rotate and displace relative to the pressure clutch 111. Note that the back clearance portions 115a are formed and integrally connected flush with the adjacent tooth bottoms at the pressure-side fitting portion 115 of the pressure clutch 111, and therefore, physical contact such as collision of the protruding teeth 108a with the spline tooth forming the pressure-side fitting portion 115 is not caused.

Figure 6:
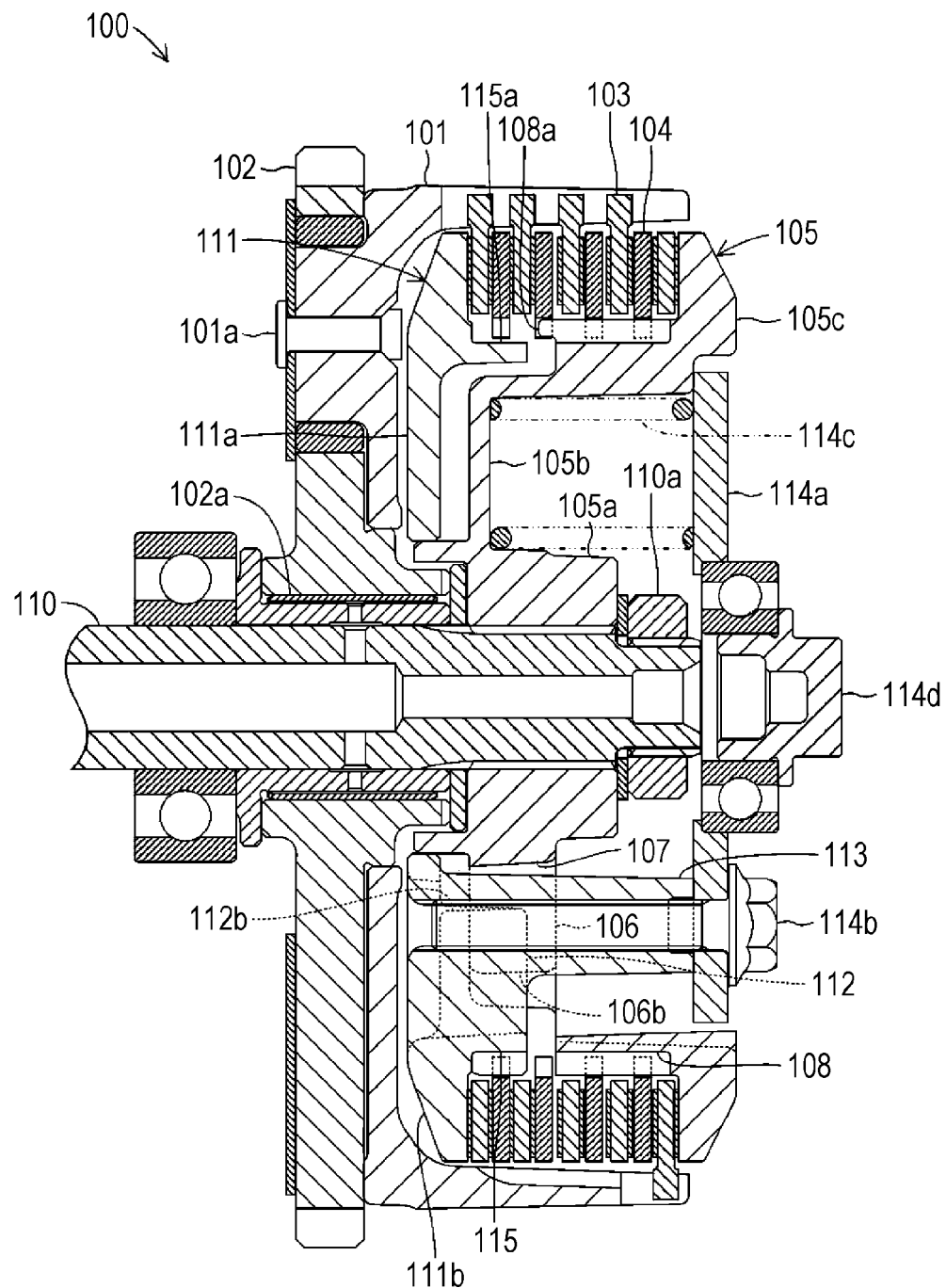
FIG. 6 is a sectional view illustrating a clutch OFF state in the clutch device illustrated in FIG. 1.

On the other hand, in the clutch device 100, in a case where the driver of the vehicle has operated the clutch operation lever, the clutch release mechanism (not shown) presses the release pin 114d as illustrated in FIG. 6. Thus, the pressure clutch 111 displaces in the direction of separating from the center clutch 105 against the elastic force of the clutch springs 114c. Accordingly, the center clutch 105 is brought into a clutch OFF state in which friction coupling among the friction plates 103 and the clutch plates 104 is cancelled. Thus, a state in which rotary drive is attenuated or stopped is brought. That is, the rotary drive force of the motor is blocked from the center clutch 105.

In this case, the center-side assist cam surface 106a and the pressure-side assist cam surface 112a are in a separated state, and the center-side slipper cam surface 106b and the pressure-side slipper cam surface 112b are in a separated state. Thus, each of the assist torque Ta and the slipper torque Ts is not generated.

Moreover, in the clutch OFF state, the protruding tooth 108a formed at the center outer ring-shaped protruding portion 105c of the center clutch 105 is, at a separated position not overlapping the back clearance portion 115a formed at the pressure-side fitting portion 115 of the pressure clutch 111, positioned above a separated clearance between a center-side end surface of the center-side fitting portion 108 and a pressure-side end surface of the pressure-side fitting portion 115. Thus, the friction plates 103 and/or the clutch plates 104 present at the boundary portion between the center-side fitting portion 108 and the pressure-side fitting portion 115 are not dropped from the center outer ring-shaped protruding portion 105c and the pressure outer ring-shaped protruding portion 111b because of the protruding teeth 108a.

As can be understood from actuation description above, according to the above-described embodiment, the assist contact surface Fa as a contact surface between the center-side assist cam surface 106a and the pressure-side assist cam surface 112a and the slipper contact surface Fs as a contact surface between the center-side slipper cam surface 106b and the pressure-side slipper cam surface 112b are formed at different positions in the radial direction of the center clutch 105, and therefore, the clutch device 100 can set different desired torque values.

Further, implementation of the present invention is not limited to the above-described embodiment, and various changes can be made without departing from the object of the present invention. Note that in each variation described below, the same reference numerals as or corresponding reference numerals to those assigned to the clutch device 100 are used to represent components similar to those of the clutch device 100 in the above-described embodiment, and description thereof will be omitted as necessary.

For example, in the above-described embodiment, in the clutch device 100, the center-side slipper cam surface 106b is formed at the position on the inner side of the center-side assist cam surface 106a in the radial direction, and therefore, the slipper contact surface Fs is formed at the position on the inner side of the assist contact surface Fa in the radial direction of the center clutch 105. The radial positions of the center-side assist cam surface 106a and the center-side slipper cam surface 106b as described herein are compared in terms of each of the center positions of the widths of the assist contact surface Fa and the slipper contact surface Fs in the radial direction.

On the other hand, the pressure-side assist cam surface 112a and the pressure-side slipper cam surface 112b are formed at the same position to have the same length in the radial direction of the pressure clutch 111 (the center clutch 105). That is, in the clutch device 100, the center-side slipper cam surface 106b is formed in a state in which the center-side slipper cam surface 106b is integrally connected to an outer surface of the center inner ring-shaped protruding portion 105a of the center clutch 105. Further, the center-side slipper cam surface 106b is formed to have a shorter length than the length of the center-side assist cam surface 106a in the radial direction. With this configuration, in the clutch device 100, shaping of each cam surface can be facilitated, and stiffness of each of these cam surfaces and the center inner ring-shaped protruding portion 105a can be improved.

However, in the clutch device 100, the slipper contact surface Fs may be formed at the position on the inner side of the assist contact surface Fa in the radial direction of the center clutch 105, and is not limited to the above-described embodiment. Thus, in the clutch device 100, instead of or in addition to formation of the center-side slipper cam surface 106b at the position on the inner side of the center-side assist cam surface 106a in the radial direction, the pressure-side slipper cam surface 112b may be formed at a position on the inner side of the pressure-side assist cam surface 112a in the radial direction, for example.

Moreover, in the above-described embodiment, the slipper contact surface Fs is formed at the position on the inner side of the assist contact surface Fa in the radial direction of the center clutch 105. According to such a configuration, the clutch device 100 can provide the driver with the feeling of a clutch device configured such that a difference from assist torque Ta which is generally greater than slipper torque Ts is great. However, in the clutch device 100, the center-side assist cam surface 106a and the pressure-side assist cam surface 112a may be formed at different positions in the radial direction of the center clutch 105, and the center-side slipper cam surface 106b and the pressure-side slipper cam surface 112b may be formed at different positions in the radial direction of the center clutch 105.

Figure 7:
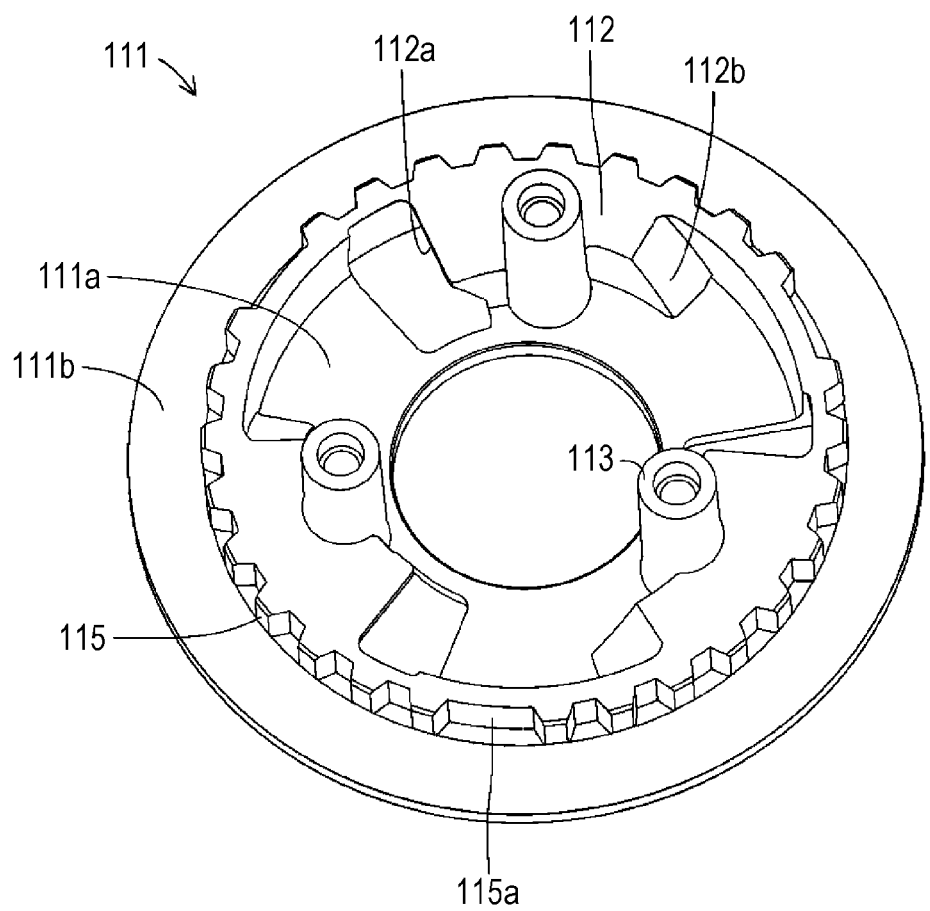
FIG. 7 is a perspective view schematically illustrating an external configuration of a pressure clutch incorporated in a clutch device according to a variation of the present invention.
Figure 8:
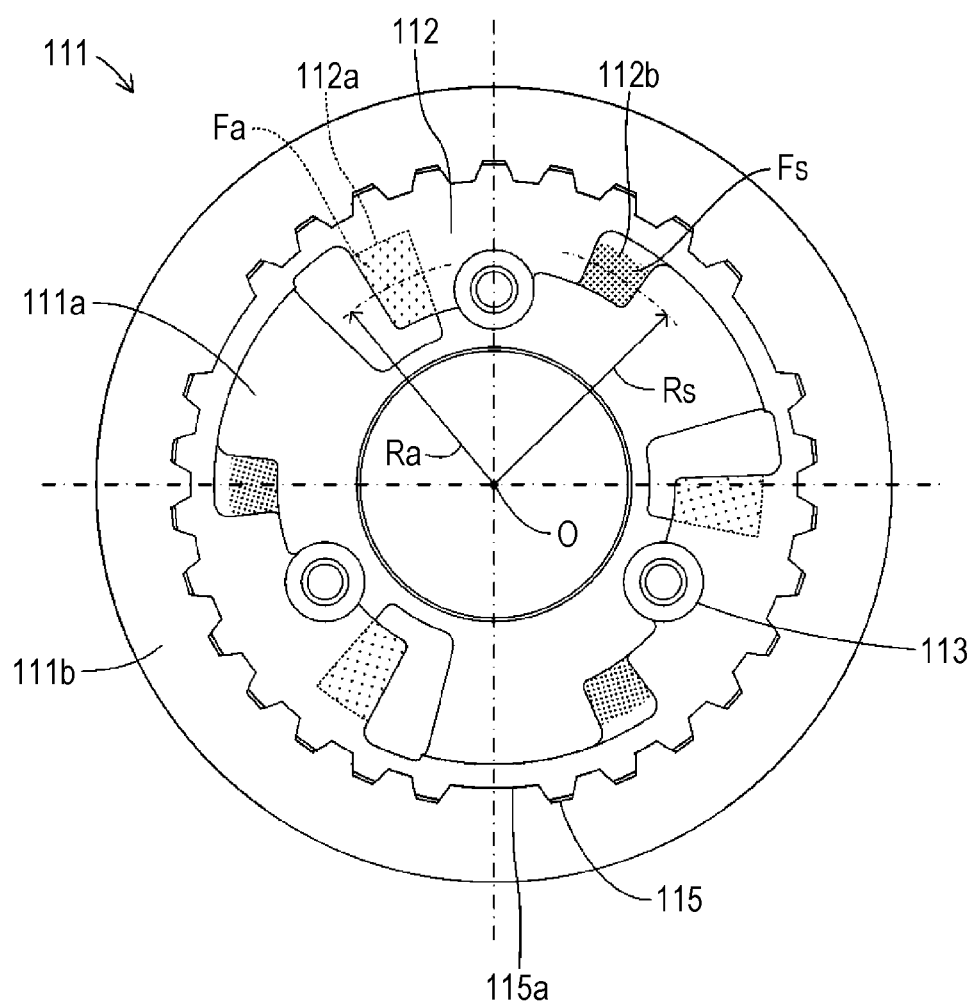
FIG. 8 is a plan view schematically illustrating the external configuration of the pressure clutch illustrated in FIG. 7.

Thus, as illustrated in, e.g., each of FIGS. 7 and 8, in the clutch device 100, the pressure-side slipper cam surface 112b can be formed at a position on the outer side of the pressure-side assist cam surface 112a in the radial direction of the pressure clutch 111 (the center clutch 105), and the slipper contact surface Fs can be formed at a position on the outer side of the assist contact surface Fa in the radial direction of the center clutch 105. That is, in the clutch device 100, the center-side slipper cam surface 106b and/or the pressure-side slipper cam surface 112b can be formed at positions on the outer side of the center-side assist cam surface 106a and/or the pressure-side assist cam surface 112a in the radial direction of the center clutch 105, and the slipper contact surface Fs can be formed at a position on the outer side of the assist contact surface Fa in the radial direction of the center clutch 105. According to such a configuration, the clutch device 100 can provide the driver with the feeling of a clutch device configured such that a difference from assist torque Ta which is generally greater than slipper torque Ts is small.

Note that in a case where the slipper contact surface Fs is formed on the outer side of the assist contact surface Fa in the radial direction, the pressure-side slipper cam surface 112b is, in the clutch device 100, formed in a state in which the pressure-side slipper cam surface 112b is integrally connected to an inner surface of the pressure outer ring-shaped protruding portion 111b of the pressure clutch 111, and is formed to have a shorter length than the length of the pressure-side assist cam surface 112a in the radial direction. Thus, shaping of each cam can be facilitated, and stiffness of each of these cam surfaces and the pressure outer ring-shaped protruding portion 111b can be improved. Moreover, in FIG. 8, the assist contact surface Fa is indicated by light hatching, and the slipper contact surface Fs is indicated by dark hatching.

Moreover, in the above-described embodiment, the slipper contact surface Fs is formed to have a smaller area than the contact area of the assist contact surface Fa. According to such a configuration, in the clutch device 100, the configuration of a portion forming the center-side slipper cam surface 106b and the pressure-side slipper cam surface 112b can be downsized, and the weights of the center clutch 105 and the pressure clutch 111 can be reduced. However, the slipper contact surface Fs can be formed to have an area equal to or greater than the contact area of the assist contact surface Fa.

Further, in the above-described embodiment, the clutch device 100 is configured as a so-called outer cut type for turning off the clutch when the clutch release mechanism (not shown) provided outside the clutch device 100 presses the release pin 114d. However, the clutch device according to the present invention can be also configured as a so-called inner cut type for turning off the clutch by the clutch release mechanism provided inside the clutch device.

Figure 9:
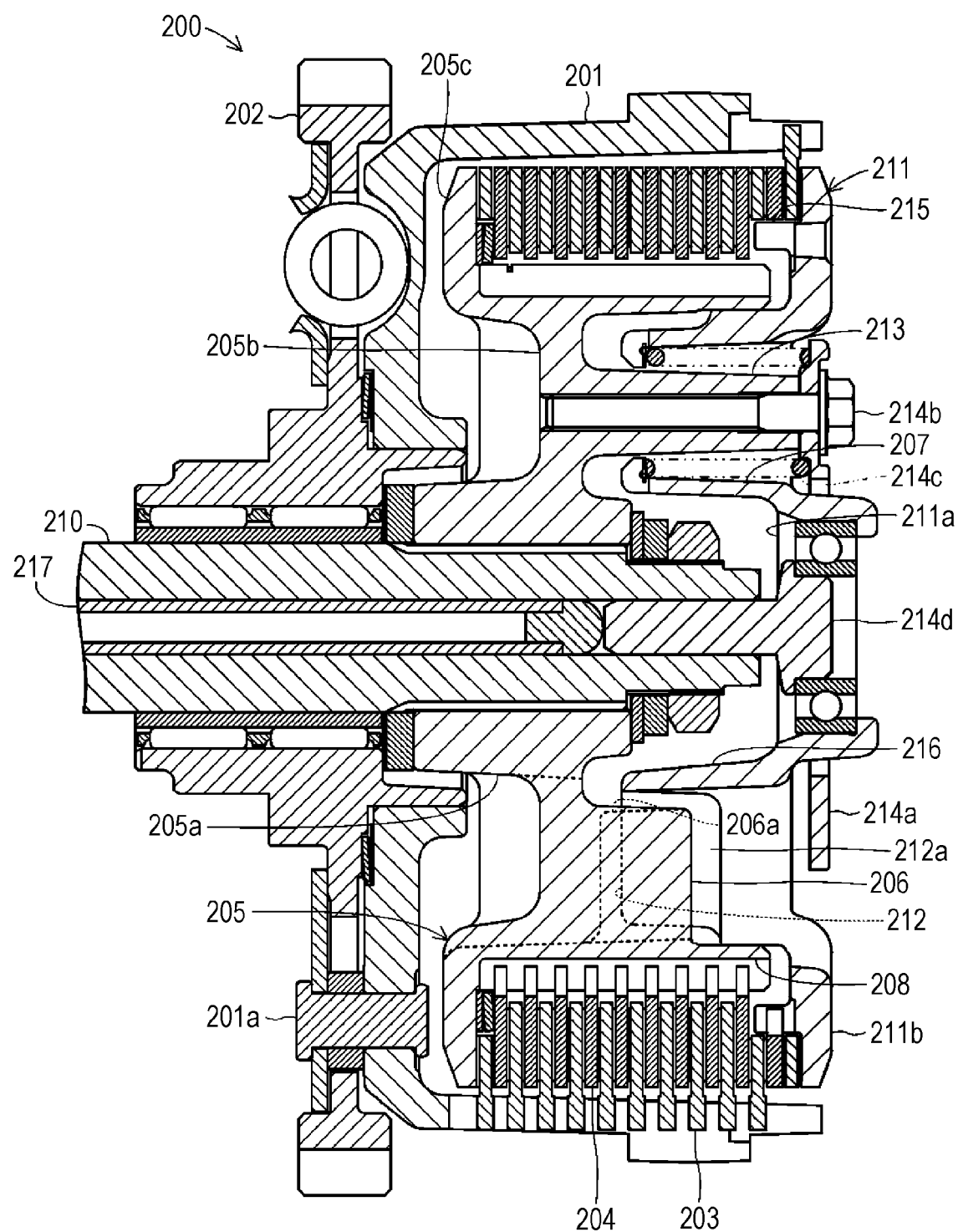
FIG. 9 is a sectional view illustrating the outline of an entire configuration of the clutch device according to the variation of the present invention, the clutch device being in a clutch ON state.

Specifically, as illustrated in FIG. 9, a clutch device 200 includes a clutch housing 201, an input gear 202, friction plates 203, clutch plates 204, a center clutch 205, center-side cam portions 206, support rod through-holes 207, a center-side fitting portion 208, a shaft 210, a pressure clutch 211, pressure-side cam portions 212, tubular support rods 213, a support plate 214a, attachment bolts 214b, clutch springs 214c, a release pin 214d, and a pressure-side fitting portion 215, these components each corresponding to the clutch housing 101, the input gear 102, the friction plates 103, the clutch plates 104, the center clutch 105, the center-side cam portions 106, the support rod through-holes 107, the center-side fitting portion 108, the shaft 110, the pressure clutch 111, the pressure-side cam portions 112, the tubular support rods 113, the support plate 114a, the attachment bolts 114b, the clutch springs 114c, the release pin 114d, and the pressure-side fitting portion 115.

In this case, the center clutch 205 is formed in a state in which the center-side cam portions 206 are integrally connected to the outside of a center inner ring-shaped protruding portion 205a formed to extend in a tubular shape toward a pressure clutch 211 side. Further, the tubular support rods 213 are formed on an inner plate portion 205b. Moreover, the tubular support rods 213 are three columnar portions which penetrate the support rod through-holes 207 and to which the support plate 214a is attached with the attachment bolts 214b, and are formed integrally with the center clutch 205.

Moreover, the pressure clutch 211 is configured such that the pressure-side cam portions 212, the support rod through-holes 207, and a pressure inner ring-shaped protruding portion 216 are formed at an inner plate portion 211a formed on the inner side of the pressure-side fitting portion 215 (i.e., in the present invention, the protruding teeth 108a and the back clearance portions 115a in the above-described embodiment are not essential configurations) having a larger diameter than that of the center-side fitting portion 208. In this case, the support rod through-hole 207 is a portion through which the tubular support rod 213 penetrates in a state in which the support rod through-hole 207 houses the clutch spring 214c. The support rod through-hole 207 is formed to have a bottomed tubular shape protruding toward a center clutch 205 side. Moreover, the pressure inner ring-shaped protruding portion 216 is a tubular portion formed at an inner edge portion of the pressure clutch 211 to protrude in a ring shape in the axial direction. The pressure inner ring-shaped protruding portion 216 is formed by a surface on the inner side with respect to the support rod through-holes 207 and the pressure-side cam portions 212.

In the shaft 210, a push rod 217 is slidably provided. The push rod 217 is a rod-shaped component for bringing the clutch OFF state by pressing the release pin 214d. The push rod 217 forms the above-described clutch release mechanism together with a component such as an actuator (not shown) configured to drive the push rod 217 and including an electric motor.

Figure 10:
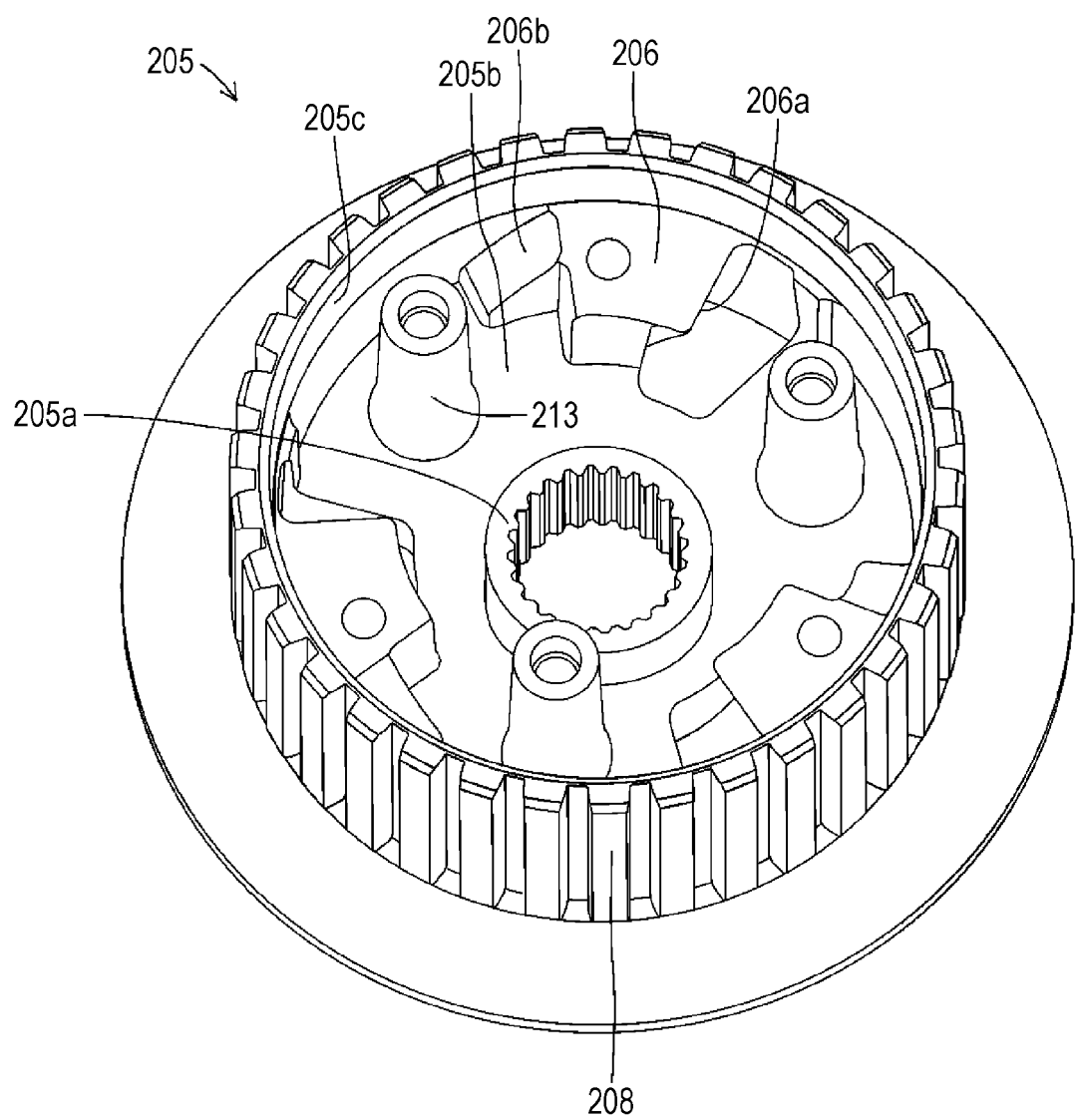
FIG. 10 is a perspective view schematically illustrating an external configuration of a center clutch incorporated in the clutch device illustrated in FIG. 9.
Figure 11:
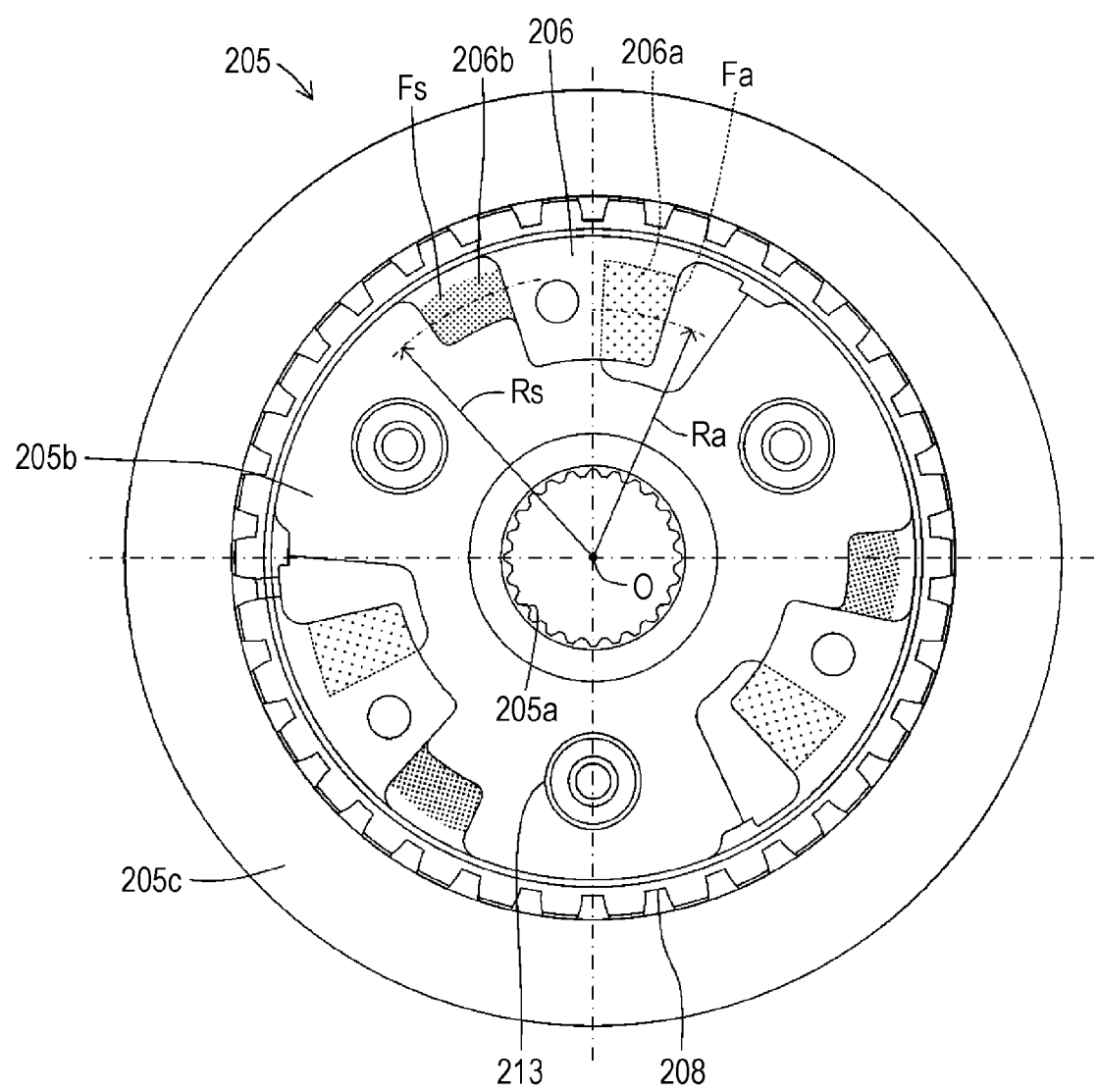
FIG. 11 is a plan view schematically illustrating the external configuration of the center clutch illustrated in FIG. 10.

In the clutch device 200, a configuration in which the positions of the assist contact surface Fa and the slipper contact surface Fs in a radial direction of the center clutch 205 are different from each other can be also employed. For example, in the clutch device 200, in a case where the slipper contact surface Fs is formed on the outer side of the assist contact surface Fa in the radial direction, these surfaces can be formed in such a manner that each of center-side assist cam surfaces 206a and center-side slipper cam surfaces 206b extends inward in the radial direction from three center-side cam portions 206 formed integrally with an inner surface of a center outer ring-shaped protruding portion 205c of the center clutch 205, as illustrated in each of FIGS. 10 and 11.

In this case, each center-side slipper cam surface 206b is formed to have a shorter length than the length of extension of the center-side assist cam surface 206a in the radial direction. With this configuration, each center-side slipper cam surface 206b is, at a position on the outer side of a radial position at which the center-side assist cam surface 206a is formed, formed to have a smaller area than the area of the center-side assist cam surface 206a.

Moreover, in this case, at the pressure clutch 211, pressure-side assist cam surfaces 212a and pressure-side slipper cam surfaces 212b are each formed to extend outward in the radial direction from three pressure-side cam portions 212 formed integrally with an outer surface of the pressure inner ring-shaped protruding portion 216. In this case, the pressure-side slipper cam surfaces 212b may be formed such that the radial length thereof is the same as that of the pressure-side assist cam surface 212a, or may be formed to have the same length at positions corresponding to the center-side slipper cam surfaces 206b.

Note that in a case where the slipper contact surface Fs is formed on the outer side of the assist contact surface Fa in the radial direction, the center-side slipper cam surface 206b is, in the clutch device 200, formed in a state in which the center-side slipper cam surface 206b is integrally connected to the inner surface of the center outer ring-shaped protruding portion 205c of the center clutch 205, and is formed to have a shorter length than the length of the center-side assist cam surface 206a in the radial direction. Thus, shaping of each cam can be facilitated, and stiffness of each of these cam surfaces and the center outer ring-shaped protruding portion 205c can be improved. Moreover, in FIG. 11, the assist contact surface Fa is indicated by light hatching, and the slipper contact surface Fs is indicated by dark hatching.

Figure 12:
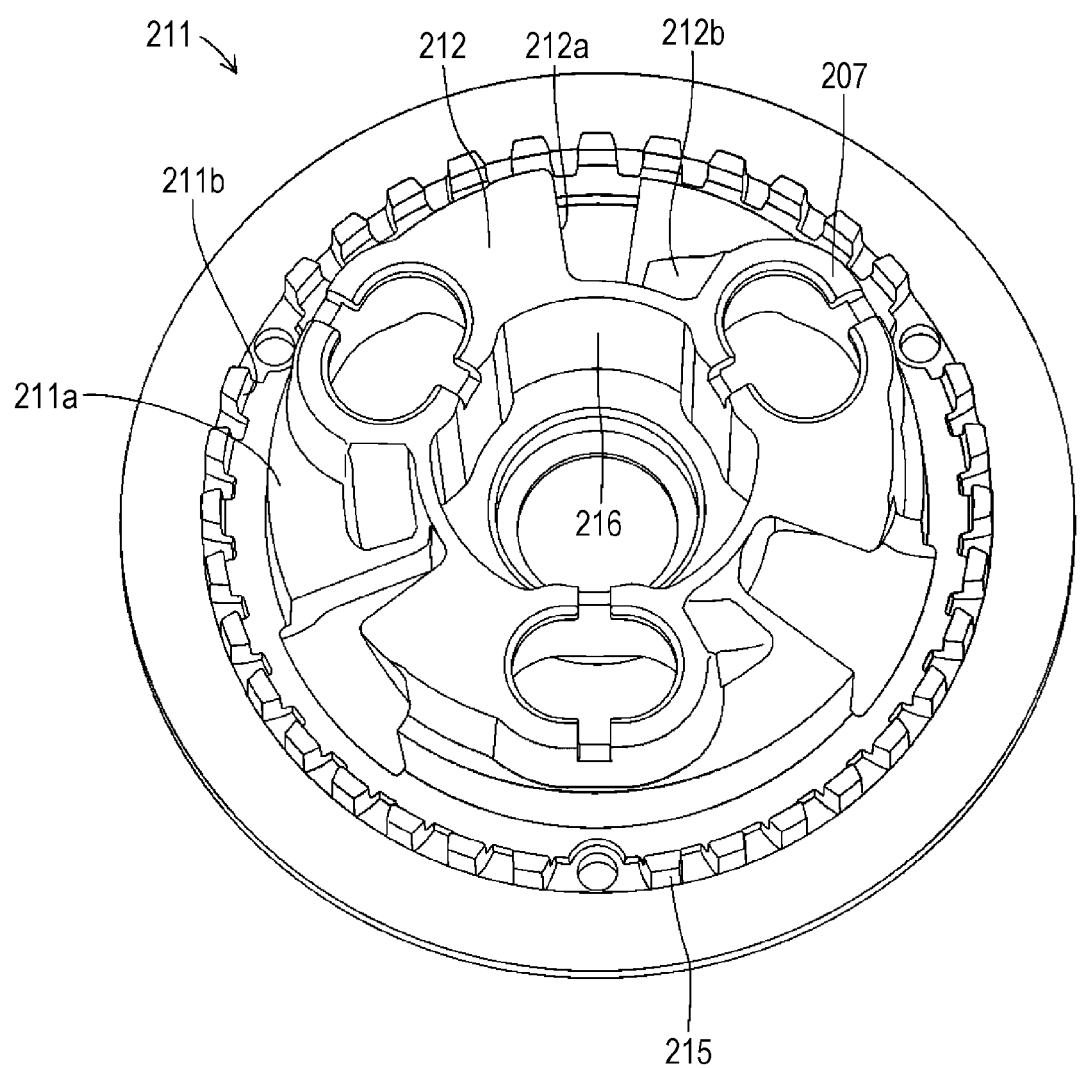
FIG. 12 is a perspective view schematically illustrating an external configuration of a pressure clutch incorporated in the clutch device illustrated in FIG. 9.
Figure 13:
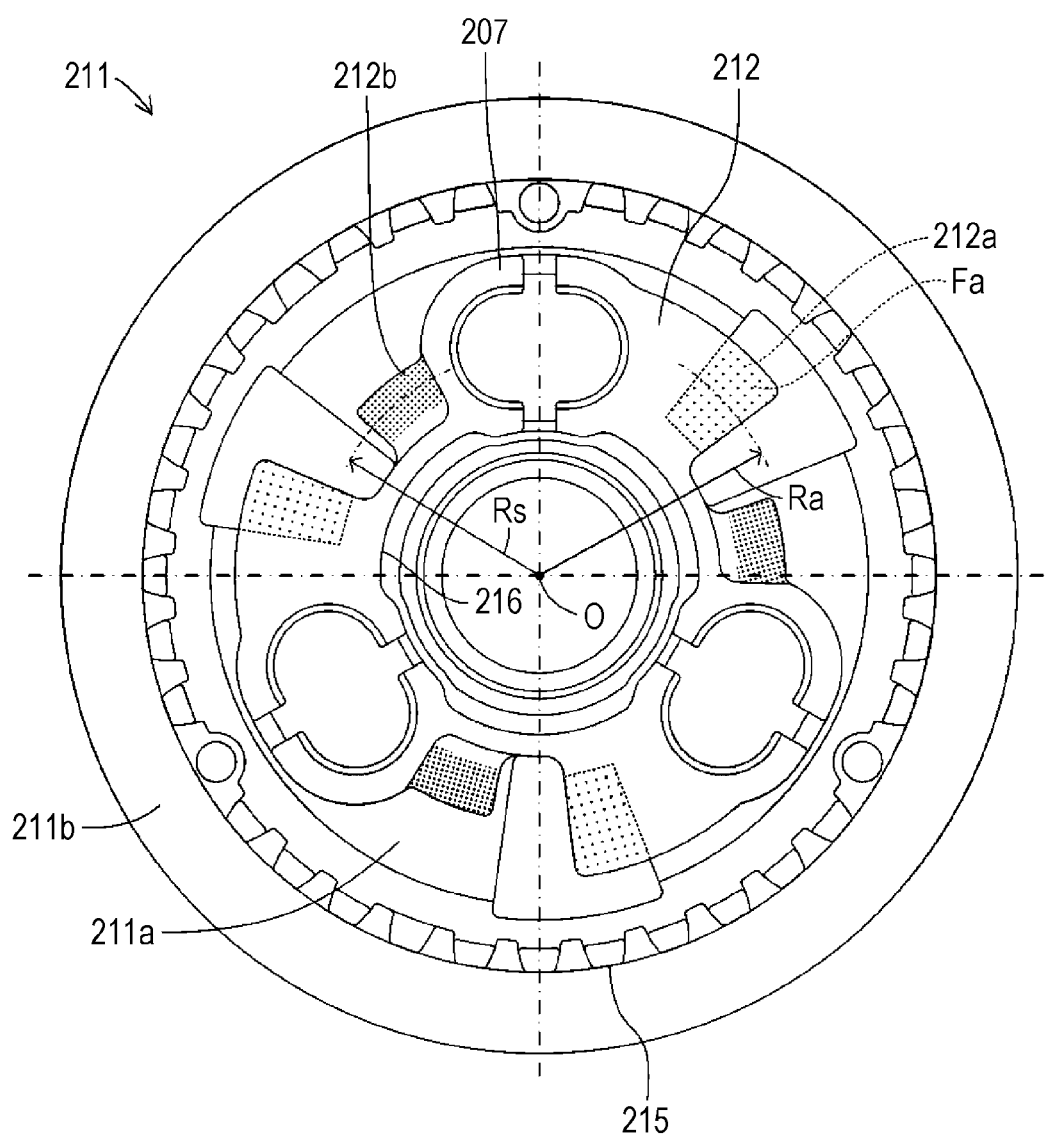
FIG. 13 is a plan view schematically illustrating the external configuration of the pressure clutch illustrated in FIG. 12.

On the other hand, in a case where the slipper contact surface Fs is formed on the inner side of the assist contact surface Fa in the radial direction, the pressure-side assist cam surfaces 212a and the pressure-side slipper cam surfaces 212b can be, in the clutch device 200, each formed to extend outward in the radial direction from three pressure-side cam portions 212 formed integrally with the outer surface of the pressure inner ring-shaped protruding portion 216 of the pressure clutch 211, as illustrated in, e.g., FIGS. 12 and 13.

In this case, each pressure-side slipper cam surface 212b is formed to have a shorter length than the length of extension of the pressure-side assist cam surface 212a in the radial direction. Thus, each pressure-side slipper cam surface 212b is, at a position on the inner side of a radial position at which the pressure-side assist cam surface 212a is formed, formed to have a smaller area than the area of the pressure-side assist cam surface 212a.

Moreover, in this case, at the center clutch 205, the center-side assist cam surfaces 206a and the center-side slipper cam surfaces 206b are each formed to extend inward in the radial direction from three center-side cam portions 206 formed integrally with the inner surface of the center outer ring-shaped protruding portion 205c. In this case, the center-side slipper cam surfaces 206b may be formed such that the radial length thereof is the same as that of the center-side assist cam surface 206a, or may be formed to have the same length at positions corresponding to the pressure-side slipper cam surfaces 212b.

Note that in a case where the slipper contact surface Fs is formed on the inner side of the assist contact surface Fa in the radial direction, each pressure-side slipper cam surface 212b is, in the clutch device 200, formed in a state in which the pressure-side slipper cam surface 212b is integrally connected to the outer surface of the pressure inner ring-shaped protruding portion 216 of the pressure clutch 211, and is formed to have a shorter length than the length of the pressure-side assist cam surface 212a in the radial direction. Thus, shaping of each cam can be facilitated, and stiffness of each of these cam surfaces and the pressure inner ring-shaped protruding portion 216 can be improved. Moreover, in FIG. 13, the assist contact surface Fa is indicated by light hatching, and the slipper contact surface Fs is indicated by dark hatching.

Figure 14:
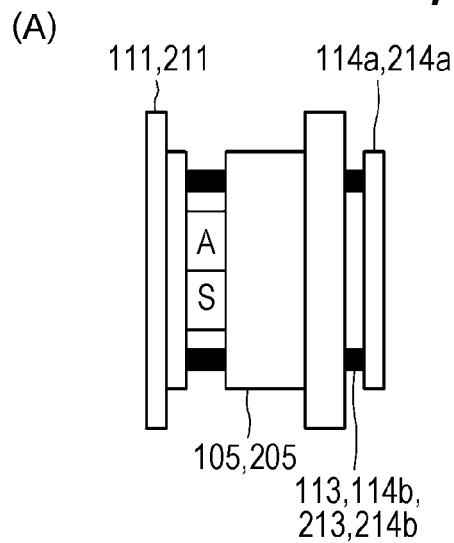
FIGS. 14(A) to 14(D) are schematic views for describing variations of formation positions of the pressure-side assist cam surface, the pressure-side slipper cam surface, the center-side assist cam surface, and the center-side slipper cam surface in the case of providing a support plate at the pressure clutch.
Figure 14:
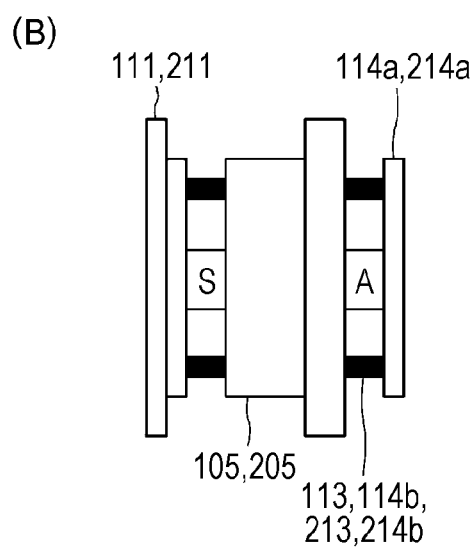
Figure 14:
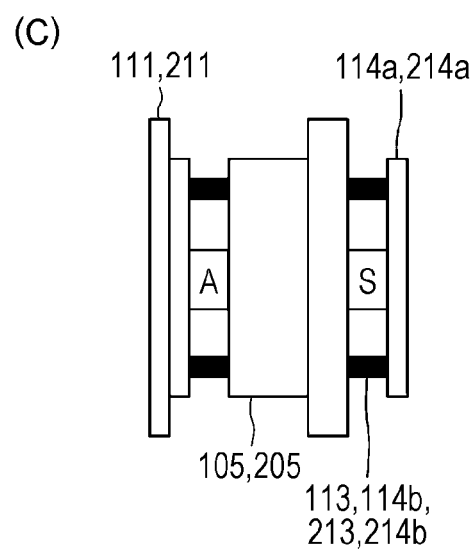
Figure 14:
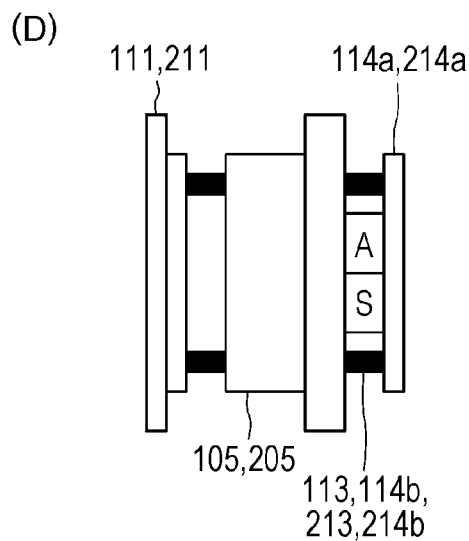

Further, as illustrated in FIG. 14(A), in the above-described embodiment and each variation, each of the pressure-side assist cam surface 112a, 212a and the pressure-side slipper cam surface 112b, 212b is formed only at the pressure clutch 111, 211. However, the pressure-side assist cam surface 112a, 212a and the pressure-side slipper cam surface 112b, 212b may be formed facing the center clutch 105, 205. Thus, as illustrated in each of FIGS. 14(B) to 14(D), at least one of the pressure-side assist cam surface 112a, 212a or the pressure-side slipper cam surface 112b, 212b may be formed at the support plate 114a, 214a rotatable together with the pressure clutch 111, 211 relative to the center clutch 105, 205.

In these cases, the pressure outer ring-shaped protruding portion 111b, 211b and the pressure inner ring-shaped protruding portion 216 can be also formed at the support plate 114a, 214a. Moreover, in these cases, the center-side assist cam surfaces 106a, 206a and the center-side slipper cam surfaces 106b, 206b are, at the center clutch 105, 205, formed at the pressure-side assist cam surfaces 112a, 212a formed at the support plate 114a, 214a and/or surfaces facing the pressure-side slipper cam surfaces 112b, 212b.

Moreover, in the above-described embodiment and each variation, the support plate 114a, 214a is coupled integrally with the pressure clutch 111, 211 at the position facing the center clutch 105, 205, and is rotatable integrally with the pressure clutch 111, 211. However, the support plate 114a, 214a can be, as illustrated in each of FIGS. 15(A) to 15(D), coupled integrally with the center clutch 105, 205 at a position facing the pressure clutch 111, 211, and can rotate integrally with the center clutch 105, 205.

Figure 15:
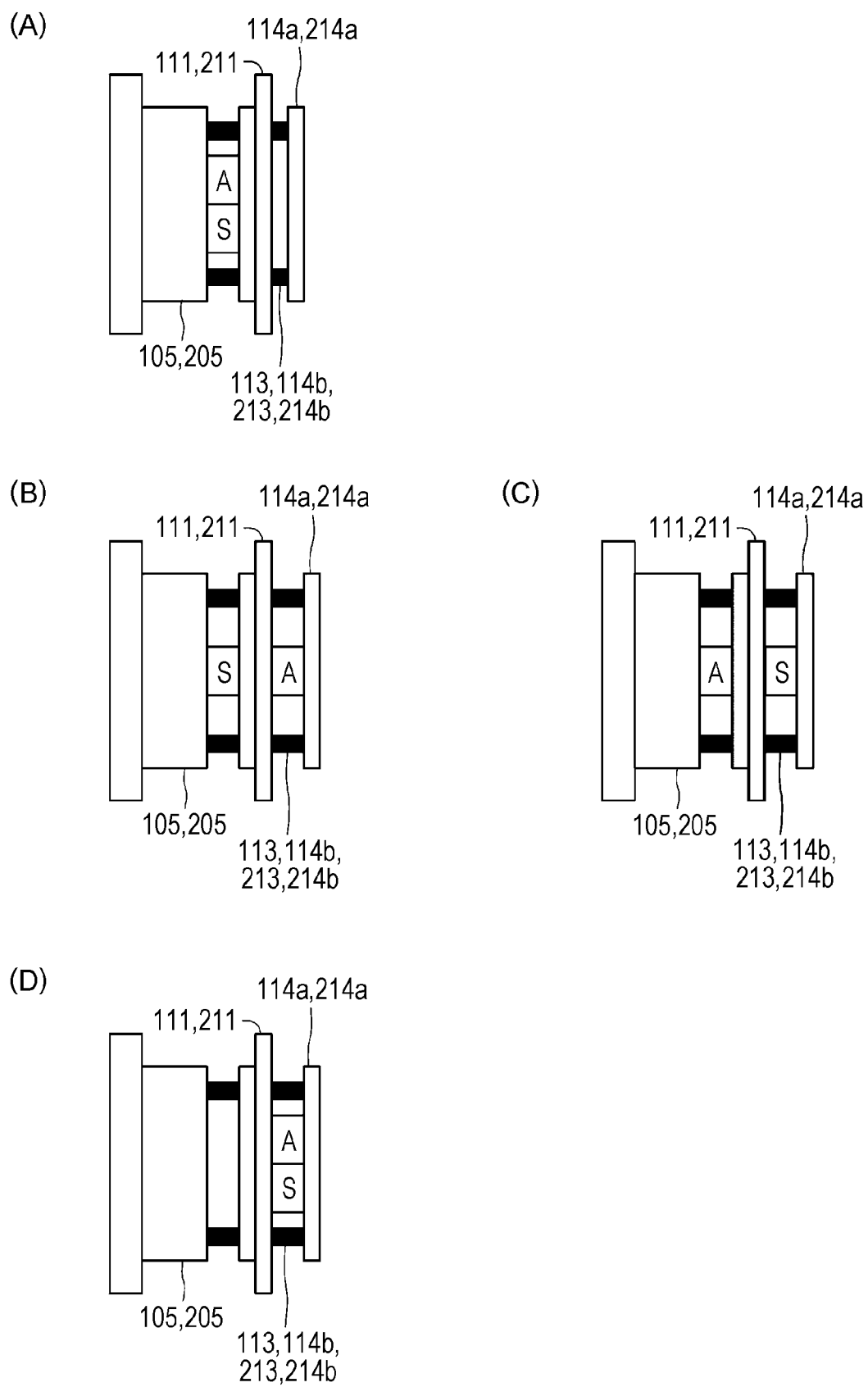
FIGS. 15(A) to 15(D) are schematic views for describing variations of the formation positions of the center-side assist cam surface, the center-side slipper cam surface, the pressure-side assist cam surface, and the pressure-side slipper cam surface in the case of providing the support plate at the center clutch.

In this case, the center-side assist cam surface 106a, 206a and the center-side slipper cam surface 106b, 206b can be, as illustrated in FIG. 15(A), formed only at the center clutch 105, 205. Moreover, as illustrated in each of FIGS. 15(B) to 15(D), at least one of the center-side assist cam surface 106a, 206a or the center-side slipper cam surface 106b, 206b can be formed at the support plate 114a, 214a rotatable integrally with the center clutch 105, 205 relative to the pressure clutch 111, 211.

In these cases, the center outer ring-shaped protruding portion 105c, 205c and the center inner ring-shaped protruding portion 105a, 205a can be also formed at the support plate 114a, 214a. Moreover, in these cases, the pressure-side assist cam surfaces 112a, 212a and the pressure-side slipper cam surfaces 112b, 212b are, at the pressure clutch 111, 211, formed at the center-side assist cam surfaces 106a, 206a formed at the support plate 114a, 214a and/or surfaces facing the center-side slipper cam surfaces 106b, 206b.

Note that in FIGS. 14(A) to 14(D) and FIGS. 15(A) to 15(D), the pressure-side assist cam surface 112a, 212a and the center-side assist cam surface 106a, 206a are indicated by a box with "A," and the pressure-side slipper cam surface 112b, 212b and the center-side slipper cam surface 106b, 206b are indicated by a box with "S."

LIST OF REFERENCE NUMERALS

O center of rotation of center clutch
Fa assist contact surface
Ta assist torque
μa friction coefficient of assist contact surface
Ra effective diameter of assist-side cam center
Pa rotary drive force from drive shaft side
Fs slipper contact surface
Ts slipper torque
μs friction coefficient of slipper contact surface
Rs effective diameter of slipper-side cam center
Ps rotary drive force from driven shaft side
100 clutch device
101 clutch housing
101a rivet
102 input gear
102a bearing
103 friction plate
104 clutch plate
105 center clutch
105a center inner ring-shaped protruding portion
105b inner plate portion
105c center outer ring-shaped protruding portion
106 center-side cam portion
106a center-side assist cam surface
106b center-side slipper cam surface
107 support rod through-hole
108 center-side fitting portion
108a protruding tooth
110 shaft
110a nut
111 pressure clutch
111a inner plate portion
111b pressure outer ring-shaped protruding portion
112 pressure-side cam portion
112a pressure-side assist cam surface
112b pressure-side slipper cam surface
113 tubular support rod
114a support plate
114b attachment bolt
114c clutch spring
114d release pin
115 pressure-side fitting portion
115a back clearance portion
200 clutch device
201 clutch housing
202 input gear
203 friction plate
204 clutch plate
205 center clutch
205a center inner ring-shaped protruding portion
205b inner plate portion
205c center outer ring-shaped protruding portion
206 center-side cam portion
206a center-side assist cam surface
206b center-side slipper cam surface
207 support rod through-hole
208 center-side fitting portion
210 shaft
211 pressure clutch
211a inner plate portion
211b pressure outer ring-shaped protruding portion
212 pressure-side cam portion
212a pressure-side assist cam surface
212b pressure-side slipper cam surface
213 tubular support rod
214a support plate
214b attachment bolt
214c clutch spring
214d release pin
215 pressure-side fitting portion
216 pressure inner ring-shaped protruding portion
217 push rod

The invention claimed is:

1. A clutch device for transmitting rotary drive force of a drive shaft to a driven shaft or blocking transmission, comprising:
a center clutch holding a clutch plate arranged facing a friction plate to be rotatably driven by rotary drive of the drive shaft and coupled to the driven shaft; and
a pressure clutch arranged facing the center clutch in a state in which the pressure clutch is able to approach or separate from the center clutch and is rotatable relative to the center clutch and elastically pressing the friction plate or the clutch plate,
wherein the pressure clutch
has each of a pressure-side assist cam surface and a pressure-side slipper cam surface as inclined surfaces projecting in an axial direction,
the center clutch has each of a center-side assist cam surface as an inclined surface configured, for causing the pressure-side assist cam surface to approach the center clutch, such that the center-side assist cam surface and the pressure-side assist cam surface slide on each other to increase approaching force upon the approaching and a center-side slipper cam surface as an inclined surface configured, for separating the pressure-side slipper cam surface, such that the center-side slipper cam surface and the pressure-side slipper cam surface slide on each other to increase separation force upon the separation,
an effective diameter of an assist contact surface in a radial direction of the center clutch is different from an effective diameter of a slipper contact surface in the radial direction of the center clutch, the assist contact surface is a contact surface between the center-side assist cam surface and the pressure-side assist cam surface and the slipper contact surface is a contact surface between the center-side slipper cam surface and the pressure-side slipper cam surface, the effective diameter of the assist contact surface is a distance between a center of rotation of the center clutch or the pressure clutch and a center position of a width of the center clutch or the pressure clutch in the radial direction at the assist contact surface, and the effective diameter of the slipper contact surface is a distance between the center of rotation of the center clutch or the pressure clutch and a center position of a width of the center clutch or the pressure clutch in the radial direction at the slipper contact surface.

2. The clutch device according to claim 1, wherein the pressure clutch includes a flat plate ring-shaped support plate arranged facing the center clutch and rotating integrally with the pressure clutch, and at least one of the pressure-side assist cam surface or the pressure-side slipper cam surface is formed at the support plate.

3. The clutch device according to claim 1, wherein the center clutch includes a flat plate ring-shaped support plate arranged facing the pressure clutch and rotating integrally with the center clutch, and at least one of the center-side assist cam surface or the center-side slipper cam surface is formed at the support plate.

4. The clutch device according to claim 1, wherein the slipper contact surface is formed at a position on an inner side of the assist contact surface in the radial direction of the center clutch.

5. The clutch device according to claim 4, wherein the center-side slipper cam surface is formed in a state in which the center-side slipper cam surface is positioned closer to a side of a center inner ring-shaped protruding portion formed at an inner edge portion of the center clutch to protrude in a ring shape in the axial direction and is integrally connected to the center inner ring-shaped protruding portion, or the pressure-side slipper cam surface is formed in a state in which the pressure-side slipper cam surface is positioned closer to a side of a pressure inner ring-shaped protruding portion formed at an inner edge portion of the pressure clutch to protrude in a ring shape in the axial direction and is integrally connected to the pressure inner ring-shaped protruding portion.

6. The clutch device according to claim 1, wherein the slipper contact surface is formed at a position on an outer side of the assist contact surface in the radial direction of the center clutch.

7. The clutch device according to claim 6, wherein the pressure-side slipper cam surface is formed in a state in which the pressure-side slipper cam surface is positioned closer to a side of a pressure outer ring-shaped protruding portion formed at an outer edge portion of the pressure clutch to protrude in a ring shape and is integrally connected to the pressure outer ring-shaped protruding portion, or the center-side slipper cam surface is formed in a state in which the center-side slipper cam surface is positioned closer to a side of a center outer ring-shaped protruding portion formed at an outer edge portion of the center clutch to protrude in a ring shape and is integrally connected to the inside of the center outer ring-shaped protruding portion.

8. The clutch device according to claim 1, wherein the slipper contact surface is formed to have a smaller area than an area of the assist contact surface.

\* \* \* \* \*